(12) United States Patent
Chitrapura et al.

(10) Patent No.: US 11,295,375 B1
(45) Date of Patent: Apr. 5, 2022

(54) MACHINE LEARNING BASED COMPUTER PLATFORM, COMPUTER-IMPLEMENTED METHOD, AND COMPUTER PROGRAM PRODUCT FOR FINDING RIGHT-FIT TECHNOLOGY SOLUTIONS FOR BUSINESS NEEDS

(71) Applicant: Cuspera Inc., Watkinsville, GA (US)

(72) Inventors: Krishna Prasad Chitrapura, Watkinsville, GA (US); Subrahmanyam Vempati, Watkinsville, GA (US); Srujana Merugu, Watkinsville, GA (US)

(73) Assignee: Cuspera Inc., Watkinsville, GA (US)

( * ) Notice: Subject to any disclaimer, the term of this patent is extended or adjusted under 35 U.S.C. 154(b) by 78 days.

(21) Appl. No.: 16/395,231

(22) Filed: Apr. 26, 2019

Related U.S. Application Data

(60) Provisional application No. 62/663,207, filed on Apr. 26, 2018.

(51) Int. Cl.
*G06Q 30/00* (2012.01)
*G06Q 30/06* (2012.01)
(Continued)

(52) U.S. Cl.
CPC ......... *G06Q 30/0643* (2013.01); *G06N 5/04* (2013.01); *G06N 20/00* (2019.01); *G06Q 10/06313* (2013.01); *G06Q 50/01* (2013.01)

(58) Field of Classification Search
CPC ......... G06Q 30/0643; G06Q 10/06313; G06Q 10/0631
(Continued)

(56) References Cited

U.S. PATENT DOCUMENTS 7,827,125 B1 * 11/2010 Rennison ............ G06F 16/3332
706/14
10,417,653 B2 * 9/2019 Milton ............... G06Q 30/0205
(Continued)

OTHER PUBLICATIONS

Tang, Q. (2006). Knowledge management using machine learning, natural language processing and ontology (Order No. U584821). Available from ProQuest Dissertations & Theses Global. (1370354495). Retrieved from https://www.proquest.com/dissertations-theses/knowledge-management-using-machine-learning/docview/1370354495/se-2?accountid=14753 (Year: 2006).*

(Continued)

*Primary Examiner* — Michelle T Kringen
*Assistant Examiner* — Arielle E Weiner
(74) *Attorney, Agent, or Firm* — Appleton Luff

(57) ABSTRACT

A platform identifies and matches software application programs for a business user based on his/her context such as industry, location, size, etc. by providing nuanced and personalized guidance for the business user to define the business problem and the capabilities needed to solve the problem. The platform permits use of custom dimensions to map software application programs to a business user's needs, fitment etc. to help him/her find a software program that matched to the business user's needs. The platform further harvest insights from a broad spectrum of inputs, such as thought leaders, to help a business user get insight on which software program best suits him/her. The platform provides a social platform for business users to collaborate and find the best software program for their needs.

20 Claims, 20 Drawing Sheets

(51) Int. Cl.
*G06N 20/00* (2019.01)
*G06Q 50/00* (2012.01)
*G06N 5/04* (2006.01)
*G06Q 10/06* (2012.01)

(58) Field of Classification Search
USPC .................................................... 705/27.2
See application file for complete search history.

(56) References Cited

U.S. PATENT DOCUMENTS

| | | | |
|---|---|---|---|
| 2011/0075851 A1* | 3/2011 | LeBoeuf ................ | H04R 29/00 381/56 |
| 2014/0129703 A1* | 5/2014 | Patel ................... | H04L 41/5051 709/224 |
| 2016/0078471 A1* | 3/2016 | Hamedi .............. | H04L 67/1072 705/14.41 |
| 2016/0170982 A1* | 6/2016 | Djuric .................. | G06F 16/353 707/740 |
| 2017/0024392 A1* | 1/2017 | Shah ................ | G06F 16/24552 |
| 2018/0052861 A1* | 2/2018 | Seetharaman ........... | G06F 8/34 |
| 2018/0101805 A1* | 4/2018 | Park ...................... | G06N 20/00 |
| 2018/0158004 A1* | 6/2018 | Davar ................ | G06Q 10/0637 |
| 2018/0173803 A1* | 6/2018 | Grover ................ | G06F 16/9535 |
| 2020/0327599 A1* | 10/2020 | Renaud .............. | G06Q 30/0631 |

OTHER PUBLICATIONS

Ang, Q. (2006). Knowledge management using machine learning, natural language processing and ontology (Order No. U584821). Available from ProQuest Dissertations & Theses Global. (1370354495). Retrieved from https://www.proquest.com/dissertations-theses/knowledge-management-using-machine-learning/docview/1370354495/se-2?accountid=14753 (Year: 2006).*

"Finding similar documents with Word2Vec and WMD," https://markroxor.github.io/gensim/static/notebooks/WMD_tutorial.html.

Chitrapura, Krishna P., et al., "Node Ranking in Labeled Directed Graphs," CIKM'04, Nov. 8-13, 2004, Washington, DC, USA.

Kushmerick, Nicholas, "Wrapper Induction for Information Extraction," Ph.D dissertation, University of Washington (1997).

Mann, Gideon et al., "Generalized Expectation Criteria for Semi-Supervised Learning with Weakly Labeled Data," Journal of Machine Learning Research 11 (2010) 955-984.

Mihalcea, Rada, et al., "TextRank: Bringing Order into Texts," Dept. of Computer Science, Univ. of North Texas.

Mikolov, Tomas, et al., "Efficient Estimation of Word Representations in Vector Space," arXiv:1301.3781v3 [cs.CL], Sep. 7, 2013.

Pandey, Parul, "Simplifying Sentiment Analysis using VADER in Python (on Social Media Text)," https://medium.com/analytics-vidhya/simplifying-social-media-sentiment-analysis-using-vader-in-python-f9e6ec6fc52f, Sep. 23, 2018.

* cited by examiner

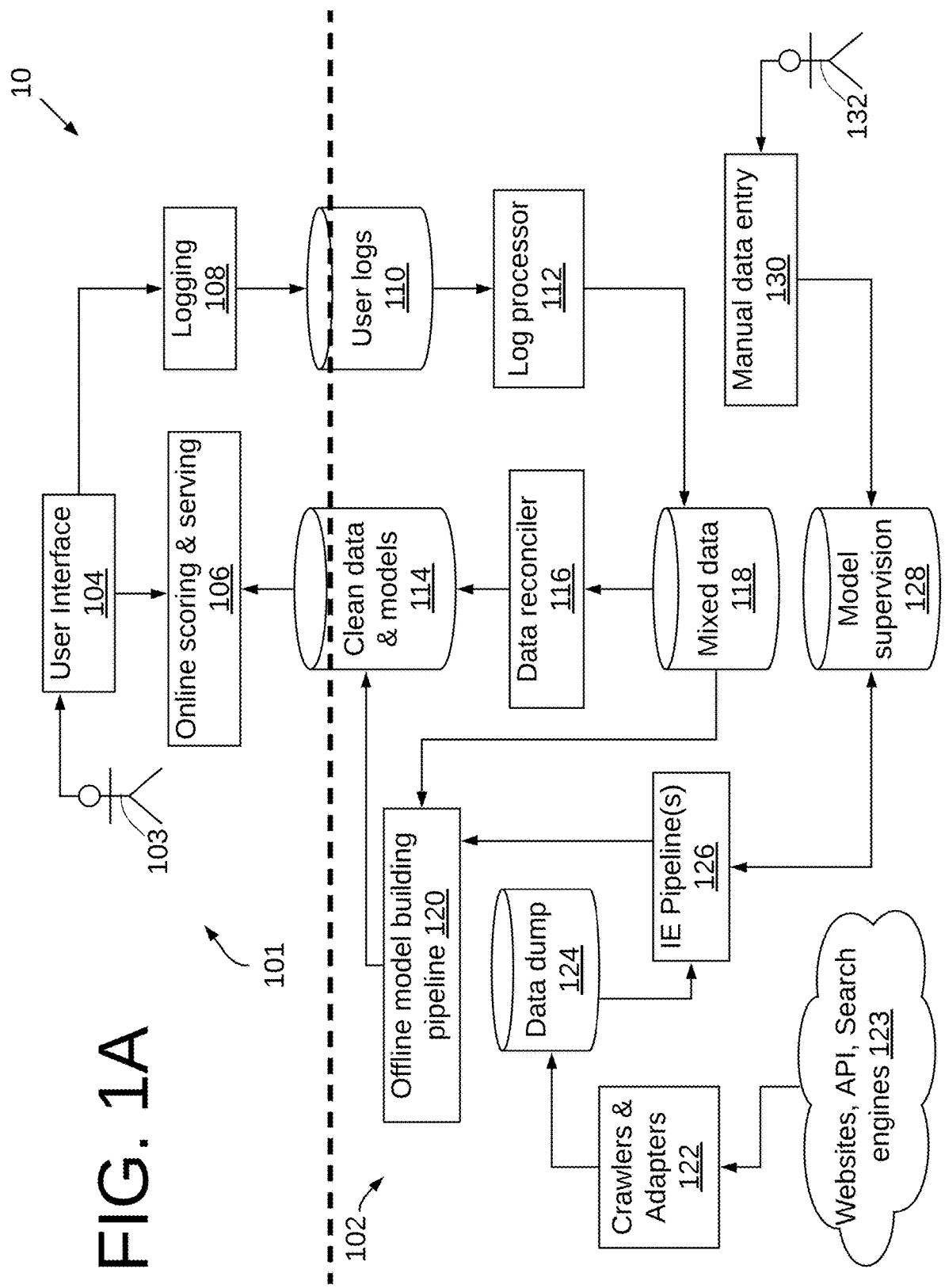

Inquiries from business users.

Respond to these inquiries to connect with business user

Total 266 inquiries for Leandata Matching                    Search by Business Problem

| Location — United States ← 334 | Industry — Computer Software ← 335 | Inquiry State — Research ← 336 | | |
|---|---|---|---|---|
| Inquiry to | Business Need | Inquiry State | Consideration list | Action |
| Inquiry #7a654396 | A Computer Software company in USA is looking for solutions for Attribution Management | Research Created 8 day(s) ago | Your software is in the consideration list | *Verify your software* *response to the consideration.* Hurry! Be first few to respond. ⌃ |
| Inquiry #ed75f97b | A Computer Software company in USA is looking for solutions for Contact List Management | Research Created 8 day(s) ago | Your software is in the consideration list | *Verify your software* *response to the consideration.* Hurry! Be first few to respond. ⌃ |

MACHINE LEARNING BASED COMPUTER PLATFORM, COMPUTER-IMPLEMENTED METHOD, AND COMPUTER PROGRAM PRODUCT FOR FINDING RIGHT-FIT TECHNOLOGY SOLUTIONS FOR BUSINESS NEEDS

RELATED APPLICATIONS

This application claims priority to provisional patent application 62/663,207 filed on Apr. 26, 2018, entitled "Computer Platform With Software Requirement Matching", which is hereby incorporated by reference in its entirety.

FIELD OF THE DISCLOSURE

This disclosure relates generally to computerized information systems and more particularly to automated identification of computer programs and computerized services.

BACKGROUND

Organizations are increasingly using computer systems to perform and automate business tasks. The software employed to perform such tasks is increasingly developed by a third-party entity (a software company) for use by a variety of customers of the third-party. This is in contrast to custom developed software. As organizations increasingly automate and as the number of third-party solutions increases it becomes increasingly difficult for an organization to identify the appropriate software to use for a particular task. For example, an organization with 1-10 people will typically have very different requirements for book-keeping software than an organization with 500 people. Similarly, for expense reporting, human resources, payroll, and other commonly used enterprise applications. A similar, and more acute problem exists for more specialized applications, such as for example, a chat application by which an organization may engage with its customers. Other examples include software applications for generating, qualifying and following up on marketing leads, conducting customer surveys, and those for performing sophisticated business analyses such as SWOT and 5C analysis. With rapid growth in cloud-based technology solutions known as Software As A Service (SAAS), technology vendors can deliver solutions across the globe to their customers and customers are keen to discover such ready to use solutions. Also, newer technologies such as artificial intelligence, mobile, robotics, and Internet of Things (IOT) have become mature and business users are interested to use novel combinations of such ready to use solutions to solve their business problems.

SUMMARY

Disclosed herein are embodiments of a computer platform to enable social interaction between business users, consultant/experts and independent software vendors to network, research, learn and match software application programs to business needs. The computer platform includes a process hierarchy tuned for a plurality of industry verticals across a plurality of business functions. An information extraction engine operates to identify processes in the process hierarchy that are contained on identified webpages. The information extraction engine also identifies business contexts in the identified webpages and identifies user sentiment of software application programs referenced implicitly or explicitly in the identified webpages. A machine learnt model is employed to predict user perception of suitability of one or more software application programs as a function of business need and business context. The model also predicts related business needs for a business user given expressed needs of the business user. A user interface provides recommendations of completeness of business needs based on the machine learnt model by collecting a business context of the user and finding software application programs most relevant to the user, employing the machine learnt model to predict satisfaction of the user with each of the software application programs as a function of business needs and business context of the user, and asking the user to select other relevant processes that the software application program needs to address to complete the user's business need.

Additional aspects related to the invention will be set forth in part in the description that follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques. Elements designated with reference numbers ending in a suffix such as .1, .2, .3 are referred to collectively by employing the main reference number without the suffix. For example, 100 refers to items 100.1, 100.2, 100.3 generally and collectively.

FIG. 1A is a high-level block diagram of an embodiment of a platform 10 that embodies the principles described herein.

FIGS. 3A, 3B, 3C, 3D, 3E, and 3F are screenshots showing various user interface aspects of the platform 10.

DETAILED DESCRIPTION

Figure 1B:
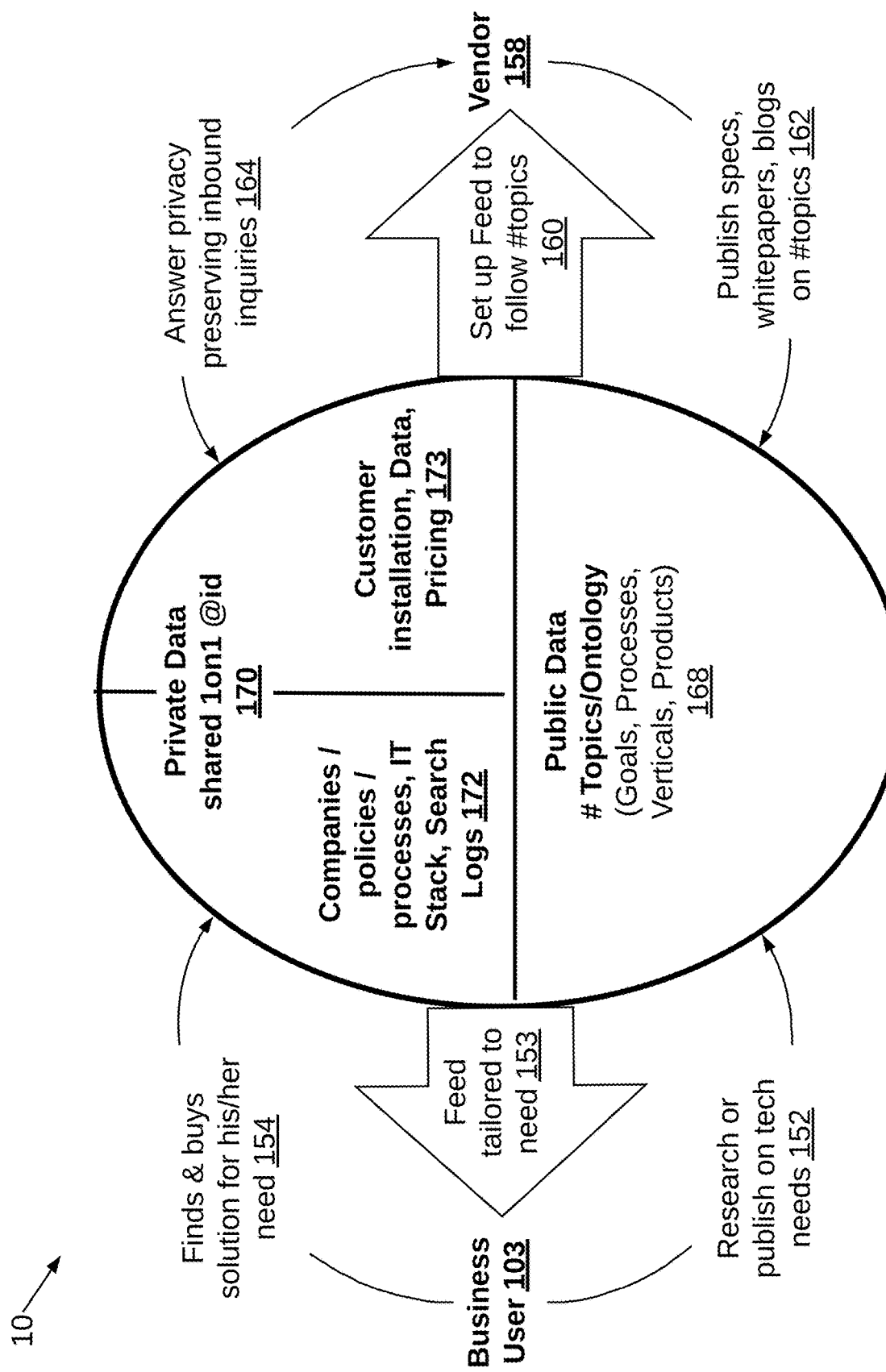
FIG. 1B is a high-level flow diagram illustrating information flow in the platform 10.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of the present invention. The following detailed description is, therefore, not to be construed in a limited sense. In the following description reference is made to various forms of acquiring computer software and/or accessing functionality provided by computer software, such as purchasing, licensing and/or buying. These terms are all understood to refer generically to the acquisition by a potential user of such software (and/or users of such software within an organization represented by the user) of the rights to use such software, and not necessarily to legal distinctions between such terms. Similarly, the terms seller, licensor and vendor are understood to all refer generically to the transfer of rights to use software provided by the seller/licensor/vendor, and not necessarily to legal distinctions between such terms.

In FIG. 1A, computer platform 10 enables social interaction between business users, consultant/experts and independent software vendors to network, research, learn and match software application programs to business needs. At a high level, the computer platform 10 can be seen to comprise a front-end set of modules 101 and a back-end set of modules 102. User 103 interacts with the platform 10 by way of engagement portal 104 that brings together users of varying interests (e.g., software buyers, sellers, consultants) to facilitate transactions in an efficient near-synchronous manner. The user 103 may be a business user, which is any user who runs a business or manages any aspect of a business. Preferably the user interface provided to the users who are software buyers and who are consultants is specifically tailored for the needs of a user and a potential purchaser of software application programs, and preferably the user interface provided to the users who are software vendors is specifically tailored for the needs of a vendor of software application programs. Each user 103 will have associated therewith a business context which identifies the context of the business user's business, such as which industry vertical the business user works in. The business user will also have associated therewith a functional area such as sales, marketing, etc., along with a geography indicating the geographical location of the business user along with the business user's rank/title etc. The business user may be within an organization, or may be a consultant, such as a management or Information Technology (IT) consultant who is hired by business user to solve his management or IT problem. The business user 103 will interact with the platform 10 to satisfy various business needs, which are problems or business processes that the business user 103 needs to solve in his/her role for their business. This includes in particular, searching for software applications by business need instead of category and features. As used herein, the term "business process" refers to a collection of related, structured activities or tasks by people or equipment which in a specific sequence produce a service or product, which serves a particular business goal for a particular customer or customers who may be internal to the organization or external to the organization. A business process may occur at all organizational levels and may or may not be visible to the customers. A business process may often be visualized (modeled) as a flowchart of a sequence of activities with interleaving decision points or as a process matrix of a sequence of activities with relevance rules based on data in the process. As used herein, the term "software application program" refers to a packaged software program (an encoded set of instructions for executing on a computer system) that is designed for the end user and which is offered to third-party customers by a vendor of the software application program.

The platform 10 advantageously identifies and matches software application programs for a business user based on his/her context such as industry, location, size, etc. by providing nuanced and personalized guidance for a business user 103 to define the business problem and the capabilities needed to solve the problem. The platform 10 permits use of custom dimensions to map software application programs to a business user's needs, fitment etc. to help him/her find a software program that matched to the business user's needs. The platform 10 further harvests insights from a broad spectrum of inputs, such as thought leaders, to help a business user get insight on which software program best suits him/her. The platform 10 provides a social platform for business users to collaborate and find the best software program for their needs. Collaborations include usage, purchases, reviews and recommendations. The platform 10 permits multi-sided interaction that facilitates interaction between demand side customers, supply side, thought leaders, and implementers to refine selection of a software program. The platform 10 further provides a social platform for Independent Software Vendors (ISVs), who are typically the developers and providers of software programs, to engage with business users and to benchmark and identify competitive advantages of their software programs. The platform 10 further provides a social platform for business users and consultants to research outcomes and best practices and software programs, and further to analyze and prioritize their business needs to optimize cost, time to deploy and potential outcomes, including what-if scenarios.

The platform 10 further permits a business user to collaborate with his/her team to find a right fit software program for their needs and also to get buy-in for deployment of the selected software program and migration to the software program. Business users and consultants may also employ the platform 10 to learn and develop their skills by keeping abreast with trending software programs in the market, and further may employ the platform 10 to do a competitive analysis of their competitors.

Turning back to FIG. 1A, online scoring and matching module 106 recommends matching result entities (e.g., software products, services, datasets, experts, videos, articles) given a query entity (e.g., business user problem scenario) using online text resources. Logging module 108 records user activity such as clicks, views, search keywords as user logs in user logs 110 which stores the sequence of user interactions with the platform 10 as well as the platform 10 responses. Log processor 112 transforms the user logs into a form that can be readily consumed by offline model building pipelines. Clean data and models 114 refer to the data/models that are passed on from the back-end 102 (offline environment) to the front-end 101 serving layer to address various use cases (e.g., match score of a software for a business need, top industries associated with a software, software company details). The data reconciler 116 resolves disagreements between data items obtained from different sources (e.g., number of employees of a company Hubspot as mentioned on LinkedIn might be different from that on Crunchbase) to create a "clean or master" dataset. The reconciler module 116 can be based on a combination of domain-specific rules and ML based methods. Mixed data 118 comprises data of uneven quality obtained from heterogeneous sources (e.g., blogs, reviews, company website, experts, users). Offline model building pipeline 120 builds various models or scores from raw data, such as for example, a customer satisfaction score of a software application program for a particular business context and needs, peer view score for a software application program and software similarity, and the results are provided to clean data and models 116. Crawlers and adapters 122 fetch online or syndicated web content, extract the relevant information and store it to the data dump 124 which is a collection of data (mostly raw webpages) from various online sources. Websites, API, search engines 123 represents sources of data from which the platform 10 collects information. IE (Information extraction) pipeline 126 extracts the relevant information from raw pages and enriches this information by annotating fields of interest such as authors, associating sentiment and identifying concepts (e.g., business activities) and relationships of interest (activity-channel). Manual data entry module 130 allows human editors 132 to provide supervision or guidance on various predicates such as relevance of a software application program for a business need, sentiment expressed in a sentence etc, which can then be used to train new automated predictive models 128 using machine learning methods.

FIG. 1B is a high-level flow diagram illustrating information flow in the platform 10. User 103 who is a business user interacts with the platform 10 to perform a variety of functions. The user 103 researches and publishes technology needs 152, finds and purchases a software application for his/her needs 154. The system 10 provides a data feed 153 tailored to the business user's needs. The data feed 153 contains statistics and insights based on the business needs shared by the user 103 (e.g., how many other users overall and in his industry queries for those needs) as well as recommendations on adjacent business needs. In addition to that, the data feed 153 contains links to blogs and news articles discussing those business problems and solution approaches. Lastly, the data feed 153 contains recommendations on top software application programs and experts for addressing those needs along with supporting links. Another user 103, in the form of a software application vendor, seen at 158 sets up a data feed 160 that provides data on topics selected by the software application vendor 158. The software application vendor 158 publishes at 162 to the platform 10 a variety of information usable by business users such as specifications for software applications offered by the software application vendor 158, whitepapers describing applications and other aspects of the software applications offered by the software application vendor 158 and other information such as blogs on topics selected by the software application vendor 158. The software application vendor 158 also answers at 164 inquiries by business users 103 regarding the software applications provided by the software application vendor 158. In certain embodiments these inquiries may be anonymized by removing personally identifiable information to preserve the privacy of business users 103. The platform 10 periodically retrieves publicly available information such as public web logs (blogs), reviews, etc., and in certain embodiments, from proprietary information sources, and maps the retrieved data via natural language processing to topics maintained by the platform 10.

The platform 10 organizes its data as public data 168 which is data that is generally publicly available and private data 170 which is data that has been provided to the platform 10 by for example a business user 103 or a vendor 158 and has been designated as private. Examples of public data include company details, product description, and common product features where there is no loss (or in fact there is an explicit gain) for the source user to make the data publicly available to everyone. The private data 170 is further organized by platform 10 as data 172 which is private data shared by business users/organizations looking to buy software (e.g., biz requirements, company procurement policies). Data 173 is private data shared by software vendors (e.g., previous installations, pricing information). In both cases, the users providing the data 172 or 173 would prefer to selectively share it since the information is valuable and gives them an advantage in negotiating and managing deals.

Figure 2:
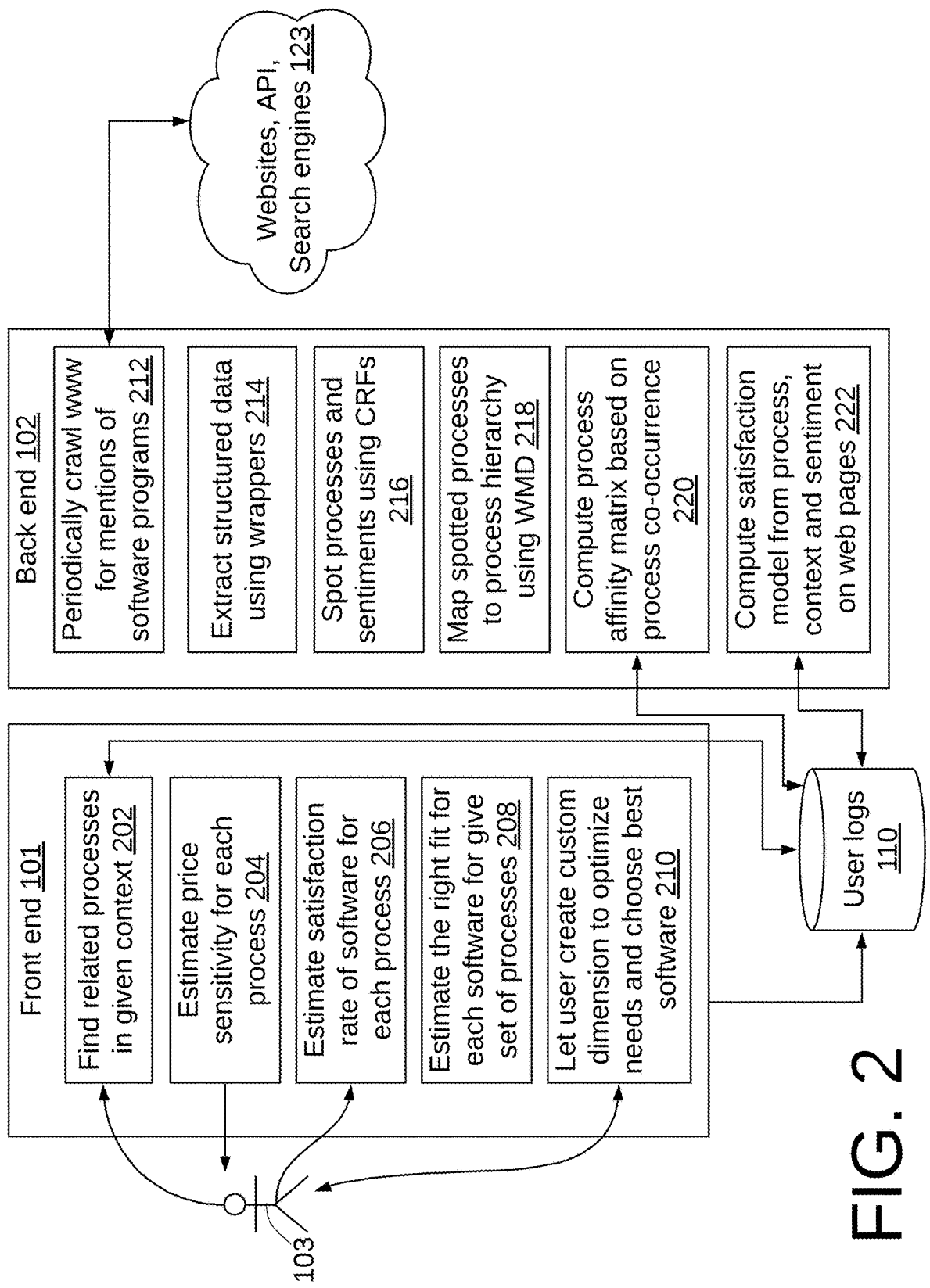
FIG. 2 is a high-level flow diagram illustrating functions performed by the platform 10.

Further understanding of the operations performed and supported by the platform 10 may be seen in FIG. 2 which is a high-level flow diagram illustrating functions performed by the platform 10. Business user 103 interacts with front-end modules 101 to perform the below listed actions, and the business user activity 103 is stored in user log 110.

Find related processes in a given context (202). The platform 10 includes a machine learnt model that predicts other business needs for a business user 103 given his/her expressed needs. A business user 103 may not be able to completely specify his/her business need as he/she may be unaware of potential software application programs that exist to solve his/her needs. Also, typically the business user 103 does not know what software application programs are trending. Given a need, the platform 10 uses the data from webpages on the Internet to show what other needs users from similar business context have solved. Preferably, techniques similar to collaborative filtering are employed. The platform employs co-occurrence of process along with the business context of the business user 103 to determine which other processes need to be considered by the business user 103. Given a symmetric co-occurrence matrix A, in which an entry $A_{ij}$ has a score which says how many times we have spotted process-i with process-j in the same webpage, the platform estimates the chances of finding process-j in the same page as process-i by using a column normalized matrix B as defined as $$B = \frac{A}{\text{diag}(\text{sum}(A))}$$

By employing transitivity, the platform 10 estimates chances of finding process-j in the same page as process-i or in the same page as any other process-k which co-occurs with process-i by $B+B^2$ and so on. The matrix B is smoothed using, for example, $\alpha=0.1$ and also have a dampening factor, for example, beta=0.9, which reduces the probability due to transitivity, a reachability matrix R is generated whose entry $R_{ij}$ estimates a stationary probability of affinity of process-j and process-i given by $$C = B \times (1-\alpha) + ones(n) \times \left(\alpha \times \frac{1}{n}\right)$$
$$R = inv(eye(n) - 0.9 \times C)$$

where n is the total number of processes in the original matrix A.

The foregoing permits finding affinity between processes based on process co-occurrence and a smoothened transitive co-occurrence of webpages. This can be extended to also find co-occurrence of business context of user and business processes. Other aspects related to the above noted techniques may be found in *Node Ranking in Label Directed Graphs*, by K. P. Chitrapura and S. R. Kashyap, presented at CIKM '04, Nov. 8-13, 2004, Washington, D.C. USA, and which may be found at the following URL: https://www.cs.umd.edu/sites/default/files/scholarly_papers/noderanking_tpdf%20.

Estimate price sensitivity for each process (204). The platform 10 predicts price sensitivity of software application programs across various business needs and contexts by employing models that predict sensitivity of certain needs to price. This is done by mapping of a business needs hierarchy to different features/capabilities of software application programs and their pricing plans. As software application programs increasingly are moving to a software as a service model, they have pricing plans mentioned on their website based any of the following pricing models: flat rate, usage based (pay as you go, metered), tiered pricing, per user pricing, per active user pricing, per feature, freemium, adaptive pricing, scalable pricing. The platform 10 employs an index list of popular software application programs that can be used to implement each business process/need. If that business process/need occurs in a majority of the pricing plans of the index list of software application programs the platform 10 assumes that the need/process is price sensitive.

Estimate satisfaction rate of a software application program for each process (206) and Compute a satisfaction model from process, context and sentiment on web pages (222). For the front-end 101 to estimate satisfaction rate of a software application program for each process (206) requires it to employ results generated by the back-end 102 by performing operation 222, computing a satisfaction model from process, context and sentiment on web pages, which will be explained first. The platform 10 employs a machine learnt model that predicts satisfaction of a particular software application program given business needs and the business context of a user 103. The machine learning model is based on processes, business contexts, and sentiments found on webpages to accurately predict how satisfied the business user 103 will be by using a given software application program for his/her expressed business needs. A process hierarchy is preferably employed to smoothen the observed needs. The platform 10 employs the following key entities:

Set of software solutions 5, indexed by i, having a cardinality N_S

Set of processes P, indexed by j, having a cardinality N_P

Company context feature vector c=[c_1, c_k, ..., c_m]

m represents the number of context dimensions, e.g., company size, user role, industry etc.

the feature vector comprises multiple features, which can be categorical, numeric, ordinal, or text based. In the embodiment described herein, the features in the feature vector are all categorical for simplicity of explanation.

The process hierarchy preferably takes a format similar to the hierarchy shown in the table below in which a high-level business function is the top level (column A) of the hierarchy, followed by multiple sub-levels of the hierarchy (columns B, C, D, E, F):

| Row | A | B | C | D | E | F |
|---|---|---|---|---|---|---|
| 1 | Sales, #1 | | | | | |
| 2 | | Sales Op, #1.5 | Call center management, #1.5.5 | | | |
| 3 | | | Content Management, #1.5.8 | | | |
| 4 | | | Partner Relationship Mgmt. (PRM), #1.5.9 | Supplier management, #1.5.9.1 | | |
| 5 | | | finance, #1.5.1 | Budget management, #1.5.1.1 | Spend management, #1.5.1.1.1 | |
| 6 | | | | Revenue management, #1.5.1.4 | Billing & invoicing, #1.5.1.4.1 | |
| 7 | | | | | Promotions management, #1.5.1.4.2 | Social promotion, #1.5.1.4.2.1 |
| 8 | | Sales Enablement, #1.1 | Knowledge management, #1.1.1 | | | |
| 9 | Support, #3 | Type, #3.1 | Phone, #3.1.1 | | | |
| 10 | | | Email, #3.1.2 | | | |

-continued

| Row | A | B | C | D | E | F |
|---|---|---|---|---|---|---|
| 11 | Marketing, #2 | Marketing Insights, Intelligence, #2.1 | Lead Analytics, #2.1.1 | | | |
| 12 | | | Marketing Mix, #2.1.2 | Place, #2.1.2.1 | | |
| 13 | | | | Product, #2.1.2.2 | | |
| 14 | | | | Price, #2.1.2.3 | | |

The platform 10 employs training data having the following characteristics (bolded text in the below bulleted points indicates a vector):
- a set of reviews R, indexed by 1, where each review has the following form $r\_l=[c\_l, s\_l, y\_l]$
- $c\_l$ represents a context vector of the company in the $l^{th}$ review
- $s\_l$ represents an identifier that uniquely identifies the software application program in question in the $l^{th}$ review
- $y\_l$ represents a binary vector of size $N\_P$ that captures the outcomes of using software application program $s\_l$ in the context $c\_l$ for the $N\_P$ processes according to the $l^{th}$ review
- Note: $y\_l$ may take three levels (positive-mention, negative-mention, no-mention). For simplicity of explanation, the negative-mention and no-mention levels are merged together. Those skilled in the art in view of the present disclosure will understand how this may be extended to multiple ordinal levels.

The platform 10 employs the following scoring/prediction scenario where each business problem q is made up of a company context vector and a process relevance vector, where $$q=[c,w]$$

where,
c=company context for the current problem
w=a binary vector of size $N\_P$ that captures the relative importance of the various processes for the current business problem. Note: for simplicity of explanation, a binary importance i.e., values in $\{1, 0\}$ is assumed. Those skilled in the art in view of the present disclosure will understand how this may be extended to be on a continuum.

The platform 10 employs the following objective: given a query q, identify the software application program s with the highest chance of overall successful outcome (where outcomes are denoted by z) i.e., $$\text{argmax}\_\{i \in S\} Pr(z=1|q,s=i)$$

Since the platform 10 does not employ explicit observations of overall outcomes, an overall successful outcome is employed as the case where each of the processes mentioned as important in the query have a successful outcome. Therefore, z is a function of $[y\_1, y\_j, \ldots]$ and w. In one embodiment, z=mean of the $y\_j$'s where $w\_j=1$.

$$Pr(z=1|q,s=i)=\text{Sum}\_\{j \in P\} w\_i[Pr(y\_j=1\ c,s=i)]$$

where,
c is the context vector in the query q, and $w\_j$ is the importance of process j in the query q.

The above decomposition permits construction of the overall outcome success likelihood of a software solution for a business problem from process-wise outcomes for software-context combinations. The below explanation focuses on estimating the latter from the training data. Two options may be employed to estimate process-wise outcomes for software-context combinations $Pr(y\_j|c, s)$, depending on the context features and data distributional biases.

Option 1: Discriminative models (one for each process j), also referred to as conditional models, which are a class of models used in statistical classification, especially in supervised machine learning. A discriminative classifier tries to model by just depending on the observed data while learning how to do the classification from the given statistics. Discriminative models focus on accurate prediction of the target variable given the other observed variables by optimizing the conditional likelihood of target or comparable prediction quality metrics whereas generative models attempt to capture the process of generating all the variables and often involve optimizing the joint likelihood of all the variables including the target to be predicted.

Option 2: Generative models (one for each process j)

$$Pr(y\_j=1|c,s)=Pr(y\_j=1,c,s)/[Pr(y\_j=1,c,s)+Pr(y\_j=0,c,s)]$$

Here the platform 10 employs a key independence assumption, that is conditional independence along context dimensions $$Pr(y\_j,c,s)=Pr(y\_j)Pr(s|y\_i)\text{Prod}\_\{k=1\}^m Pr(c\_k|y\_j,s)$$

Estimation from review counts is shown below $$Pr(y\_j=a)=[\#\text{reviews with outcome of } jth\ \text{process}=a]/[\#\text{reviews}]$$

$$Pr(s=i|y\_j=a)=[\#\text{reviews involving software } i \text{ with outcome of } jth \text{ process}=a]/[\#\text{reviews with outcome of } jth \text{ process}=a]$$

$$Pr(c\_k=b|y\_j=a,s=i)=[\#\text{reviews involving software } i \text{ with outcome of } jth \text{ process}=a \text{ where } kth \text{ context dimension}=b]/[\#\text{reviews involving software } i \text{ with outcome of } jth \text{ process}=a].$$

The above are smoothened over the hierarchy as explained in connection with operation 206, and in the above equations,
$Pr(Yj=a)$ is the probability that a review is associated with outcome a for process j;
$Pr(s=i|Yj=a)$ is the probability of reviews corresponding to software i given that it is associated with outcome a;
$Pr(c\_k=b|Yj=a, s=i)$ is the probability that a review is associated with context dimension $c\_k$ taking value b given that it pertains to software i and is associated with outcome a for process j;

With the background of the operation 222 performed by back-end 102 provided, explanation of operation 206, Estimate satisfaction rate of a software application program for each process, may now be provided. The platform 10 preferably employs an organization of processes arranged in a hierarchy, for example:

Sales,#1; Sales Op,#1.5; Lead Generation,#1.5.10; Email Campaigns,#1.5.10.2

In the above representation, generating sales leads using emails is a process (1.5.10.2), which is part of the parent process of lead generation (1.5.10) and is part of sales function(1) and specifically sales operations (1.5). The platform 10 operates to identify positive mentions of a process for a software application program and it is that there are more mentions at a higher level in the hierarchy and hence more confidence for the estimate at a higher level and lower confidence for mentions which are lower in the hierarchy and very rare. Preferably, hierarchical smoothing is employed to estimate satisfaction, which is represented as $$\frac{\text{positive } mentions_i}{\text{total } mentions_i}$$

for a given process i and software in the context we are interested. This ratio can be 0, undefined or very noisy when there are few mentions. An estimate is therefore preferably employed for the higher level of the hierarchy for that process i. The gamma prior smoothing estimate for a node i is given by $$sat_i = \frac{\text{positive } mentions_i + \alpha}{\text{total } mentions_i + \frac{\alpha}{sat_j}}$$

where j is the parent of i.
Here, for the root node r, $$sat_r = \frac{\text{all positive mentions}}{\text{all mentions}}$$

In the above formula, $\alpha=10$ has been employed to ensure that the sat at node i is trusted if it has more than 10 positive mentions; otherwise the platform 10 employs the sat of the parent j.

Figure 3A:
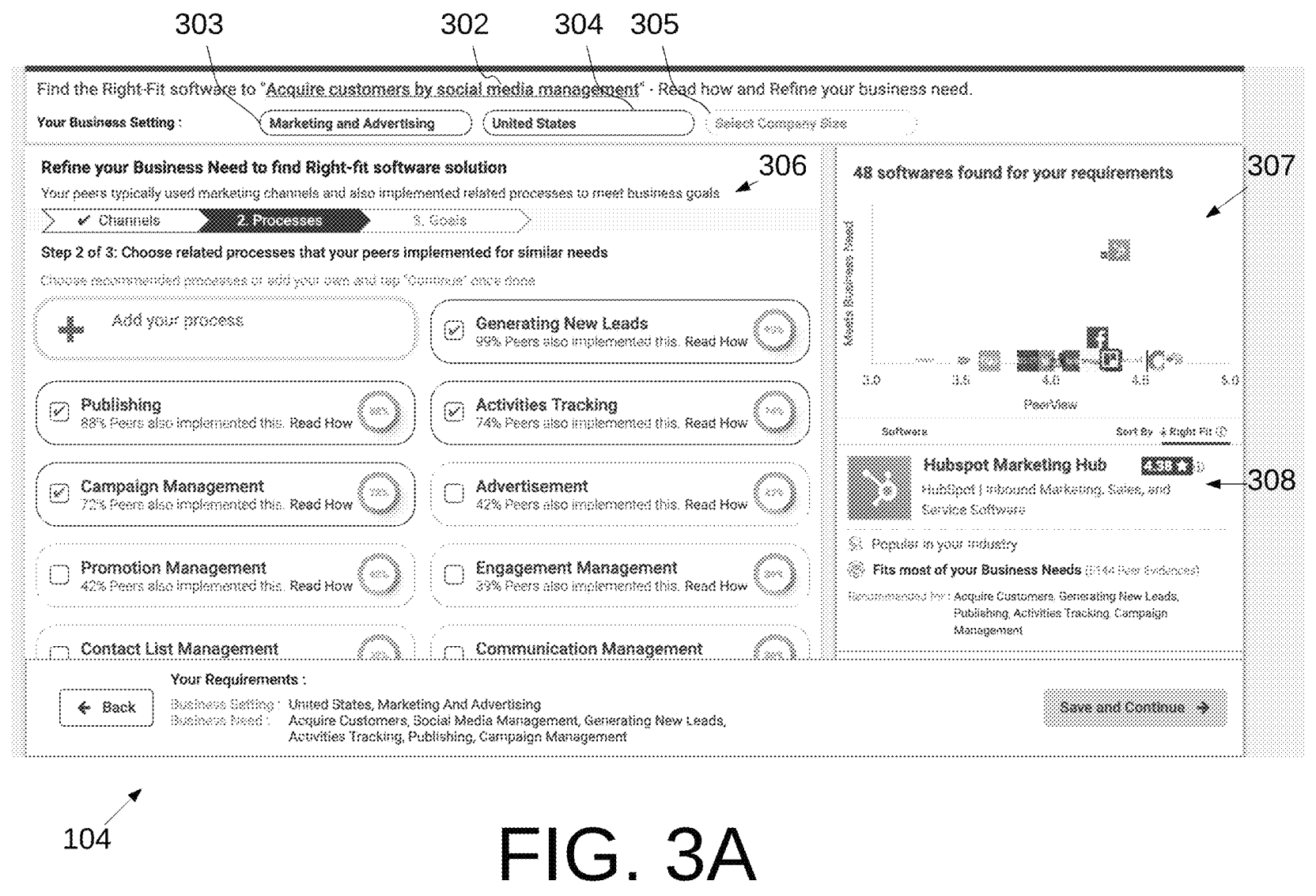
Figure 3B:
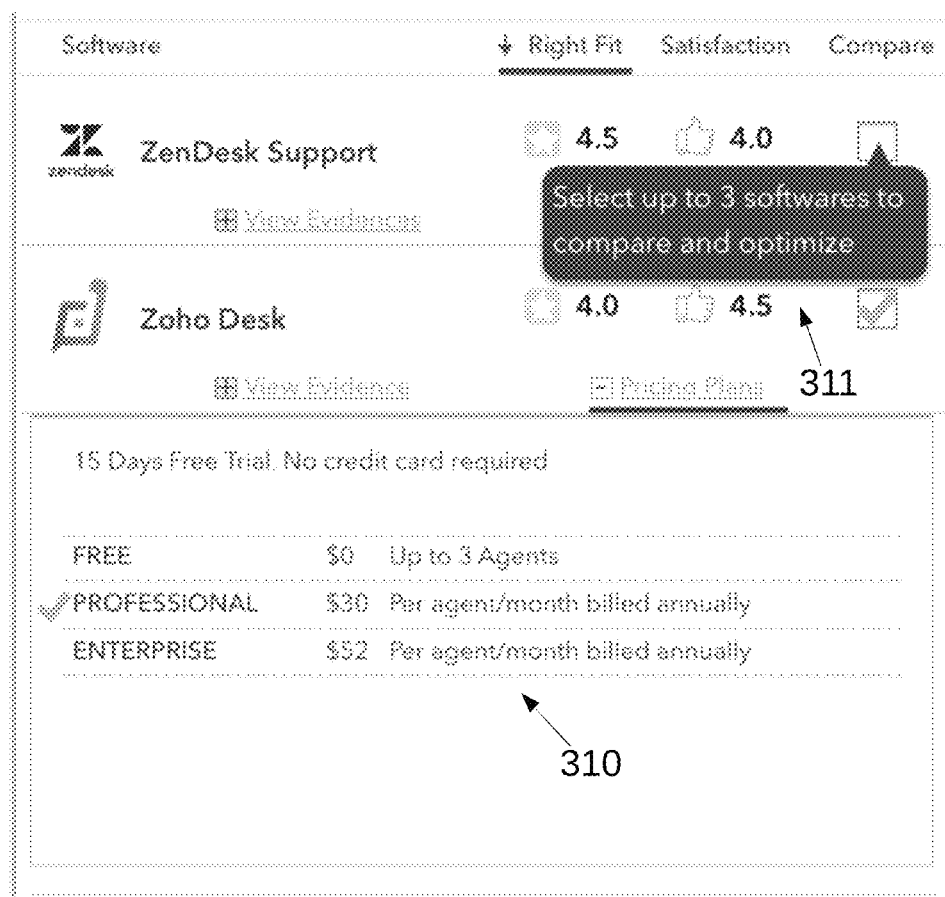

Estimate the right fit for each software application for a given set of processes (208). The platform 10 provides a mechanism to predict the right fit software application program for business needs (the user interface for which is shown in FIG. 3B). The platform 10 estimates the bloat in each software given business needs to help the user 103 identify the software application program that is most suitable, (provides the right fit) for their needs as expressed to the platform 10. The platform 10 preferably estimates the right fit to be the ratio of how many times the software application program is mentioned along with business needs expressed by the user 103 to the total number of mentions of other business needs, as expressed by other users, for that software application program.

Let the user create custom dimension to optimize needs and choose the best software application program for their needs (210). This is shown visually in connection with FIG. 3E. The platform 10 permits visual rendering of what-if optimizations for the user 103. The user interface provided by the engagement portal 104 along with the machine learnt model, and the smoothing techniques of spotted business needs, assists a business user 103 to express the importance of his/her needs and then optimize the desired software solution for satisfaction, right-fit or price. The spider chart in FIG. 3F shows results of the optimization by providing dimensions expressed by the user 103 such as satisfaction, right fit etc. given business needs and contexts.

The backend modules 102 support the functions performed by the front-end modules 101 by performing the below listed actions.

Periodically crawling the world wide web for mentions of particular software programs (212). This is performed by way of a curated list that is constructed using a semi-automated discovery process. This process in turn involves crawling category pages of multiple software aggregators (e.g., lead management softwares under g2crowd) and top software lists, linking products across different lists and manual verification.

Extracting structured data using wrappers (214). This is performed on the results of the crawling. The platform 10 provides an information extraction mechanism to spot various business contexts from webpages. Wrappers are preferably employed to extract structured business contexts such as vertical, function, titles etc. from review sites in addition to spotting, using Conditional Random Fields (CRFs), locations and other contexts of the business users 103 who have commented on process or software solutions.

Spotting processes and sentiments using CRFs (216). The information extraction mechanism described above is employed to spot sentiment expressed by other users 103 on software application programs. The platform 10 employs built and trained models that extract and map comments on business processes and software application programs to be either positive or negative using CRFs. Here, the trained model employs gazettes which are positive outcomes using software application programs to help CRFs have features that fire when a word from the gazette appears in a sentence along with some limited hand training to spot positive sentiments such as "I like the ease of use", "I like the user interface", "we increased productivity using this software", "saving me a ton of time", etc. and negative sentiment such as "I hate wasting time on this interface", "escalation handling of support an be better", "I wish there were more integration capabilities" etc.

Mapping spotted processes to a process hierarchy using Word Movers Distance (WMD) (218). The platform 10 preferably employs word movers distance (WMD) to map spotted process phrases from text to the hierarchy of processes. WMD is a method that allows assessment of the "distance" between two documents in a meaningful way, even when they have no words in common. In one implementation WMD is performed using Word2vec which is a shallow neural network based model that maps each word to a numeric vector such that words that are closer in meaning (semantics, e.g., automobile and car) are mapped to vectors that are close to each other in the Euclidean space. This approach allows the platform 10 to go beyond simple keyword based matching. Further details of Word2vec may be found in *Efficient Estimation of Word Representations in Vector Space*, by T. Mikolov et al., arXiv:1301.3781 [cs.CL], (7 Sep. 2013). The model is advantageously trained for business language by crawling sites that contain reviews about software application programs that solve business problems. Further aspects of WMD are described in https://markroxor.github.io/gensim/static/noteb ooks/WMD_tutorial.html. The platform 10 further employs a combination of k-nearest neighbour and WMD to map spotted process phrases in a node in the process hierarchy based on how close, by WMD distance, is the phrase to the process label on the hierarchy and how close is the phrase to the sample processes from that hierarchy. The below formula shows criteria used to map a spotted process phrase S to the best node P i in the process hierarchy based the lowest score for:

ARGMIN$_i$=WMD(S,Pi). α+AVERAGE(WMD(S, p∈P$_i$)·(1−α)

Here, α is the smoothing parameter between weightage to match the process hierarchy node directly vs the examples for the process hierarchy. In certain embodiments, a value between 0.3 and 0.5 is employed for α.

Computing a process affinity matrix based on process co-occurrence (220). The platform 10 provides a machine learnt model that predicts other business needs for a business user given his/her expressed needs. The platform 10 embodies the recognition that a business user 103 may not be able to completely specify his/her business need as he/she may be unaware of available software application programs to solve his/her needs and also the user 103 typically may not know the latest trends, such as newly released software application programs and reviews of such programs. Given a need expressed by a business user 103, the platform 10 uses the data from webpages on the Internet to show what other needs users from similar business contexts have been solved by available software application programs. In certain embodiments, techniques similar to collaborative filtering are employed to do this prediction. This employs co-occurrence of process along the business context of the user 103 to determine which other processes need to be considered by the user 103. Given a symmetric co-occurrence matrix A, in which an entry A$_{ij}$ has a score which expresses how many times a process-i with process-j in the same webpage has been identified. The platform 10 then estimates the chances of finding process-j in the same page as process-i by using a column normalized matrix B as defined as $$B = \frac{A}{diag(sum(A))}$$

By employing transitivity, the platform 10 estimates the chance of finding process-j in the same page as process-i or in the same page as any other process-k which co-occurs with process-i by B+B$^2$ and so on. The matrix B is further smoothened by using for example, α=0.1 and also employing a dampening factor of, for example, β=0.9, which reduces the probability due to transitivity, results in a reachability matrix R whose entry R$_{ij}$ estimates a stationary probability of affinity of process-j and process-i given by $$C = B*(1-\alpha) + ones(n)*\left(\alpha*\frac{1}{n}\right)$$
$$R = inv(eye(n) - 0.9*C)$$

where n is the total number of processes in the original matrix A, i.e., cardinality of A.

Related work to find reachability between webpages may be found in *Node Ranking in Label Directed Graphs*, by K. P. Chitrapura and S. R. Kashyap, presented at CIKM '04, Nov. 8-13, 2004, Washington, D.C. USA, and which may be found at the following URL: https://www.cs.umd.edu/sites/default/files/scholarly_papers/noderanking_tpdf%20. The platform 10 implements a system/method for finding affinity between processes based on process co-occurrence and a smoothened transitive co-occurrence of webpages. In other embodiments, this can be extended to find co-occurrence of business context of user 103 and business processes.

The engagement portal 104 collects from the business user 103, an identification of processes that the software application program needs to address to complete the business need of the user 103, and to estimate the right fit of the various matching software application programs. The business user 103 is identified by having signed or logged in. A data entry/selection screen is provided by the engagement portal 104 to collect data from the business user 103. In response to a problem statement entered by the business user the platform 10 identifies other processes identified by the platform 10 as having been implemented when implementing the problem statement identified by the user, such as "Social Media Management." The platform 10 identifies the problem statement entered by the user 103 along with a plurality of other processes together with affinity and cost. Affinity is a score that determines how often a pair of processes occur together. An affinity of 100% indicates that they always occur together. The platform 10 also provides additional processes identified by the platform 10 as having impact across multiple functions and possibly influencing outcomes for review by the user 103. Results of the query with the parameters entered at the data entry screen are shown at a results screen. The matching software application programs are identified by name and are accompanied by a satisfaction score and a Right Fit score.

The engagement portal 104 also collects from the business user 103, by way of a data entry screen, data indicative of capabilities of software application programs and of processes to be implemented by the software application programs in order to to predict prices of matching software application programs. The user 103 is prompted to identify the processes desired to be implemented by the software application program(s) to be acquired and the specific capabilities of such software application program(s). Different embodiments may employ various criteria. Examples of criteria include: integrations with other software application programs, reporting capability, data import/export capability, compliance with various standards, internationalization by language, support for cloud operability, support criteria such as language(s) and type or level, and desired average license cost, such as per user, per machine, per domain, etc. Results provided by the platform 10 are seen on a results screen. In addition to identifying software applications and their associated satisfaction and right fit scores the platform 10 provides pricing for each identified software application program. The satisfaction versus right fit is also provided. Also, a promotional offer made by a provider of a particular software application program may be shown to provide the business user 103 with a free trial license.

FIGS. 3A, 3B, 3C, 3D, 3E, and 3F illustrate various user interface aspects of the platform 10 that are employed by the business user 103 to perform certain of the operations described in connection with FIGS. 1A, 1B, and 2. In FIG. 3A, the engagement portal 104 has collected from the business user 103, the business context and has searched for the software application(s) most relevant to the business user's business context. The business user 103 is identified by signing or logging in to permit prior data entered by and generated for the business user 103 to be retrieved and for new data that is entered and generated to be associated with the business user 103. The user 103 has entered a problem statement of "Acquire customers by social media management" as seen at 302, and has entered two parameters regarding the user's business setting. One parameter is a business function Marketing and Advertising (303). The other parameter is geography: United States (304). The portal 104 also permits entry of company size (305) which the user has opted to not enter. Other examples of problem statements are lead qualification, customer NPS survey, and inbound marketing on social media platforms such as Facebook. In general, a problem statement comprises specification of (a) the business context, i.e., company size, business type, industry, department, geography, b) one or more business needs qualified by priority where each business need can be further broken down into a desired goal (e.g., acquiring new customers), business process or some specific variant that needs to be optimized (e.g., inbound marketing on Facebook), c) additional non-functional requirements, e.g., constraints on vendors, required integrations.

The platform 10 processes the user 103's input and provides output to the user 103 by way of engagement portal 104 a plurality of related processes that others similarly situated (peers) have implemented for similar needs, and the user 103 is prompted to choose one or more of the presented results shown at 306. The platform 10 also displays at 307 a graph showing the software application packages identified as matching the user 103's entered requirements (48 software application packages in this example). In the graph the horizontal axis represents the views of peers to the user 103 and the vertical axis represents match with business needs entered by the user 103. The highest rated software application package is furthest to the right and highest in the graph at 307 and details of it are provided at 308.

Figure 3C:
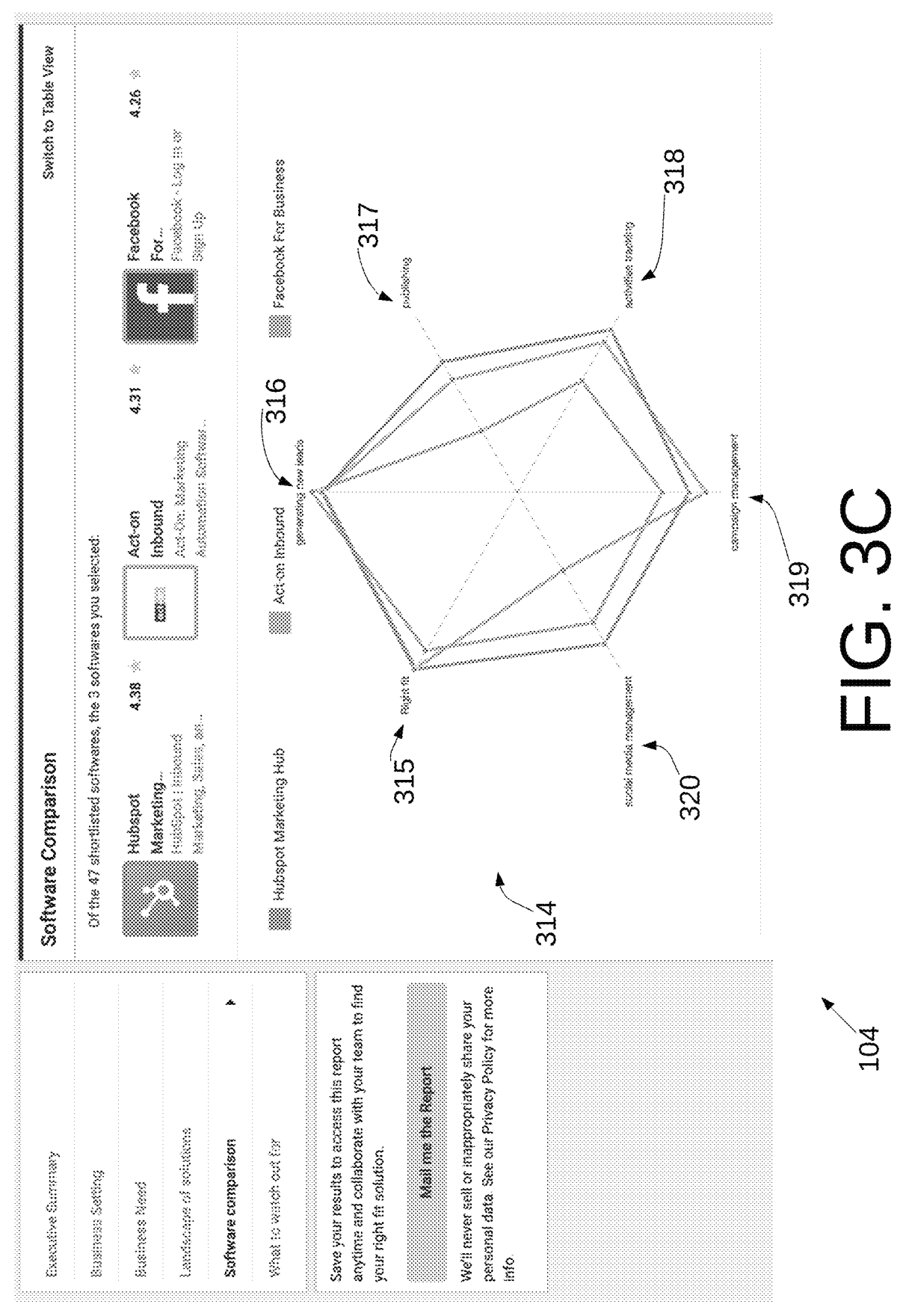

In FIG. 3B, the engagement portal 104 is shown providing pricing plans to the user 103. For the Zoho Desk software application program, three pricing plans are shown at 310: Free Professional and Enterprise. As shown at 311, the engagement portal 104 permits the user 103 to select a plurality of software application packages for comparison. In FIG. 3C, the platform 10 provides by way of engagement portal 104, a graphical representation 314 of three software application programs shortlisted by the user 103 at 311 in FIG. 3B. The graphical representation in the form of a spider chart advantageously provides a graphical comparison on multiple criteria, shown in FIG. 3C as: Right fit 315, generating new leads 316, publishing 317, activities tracking 318, campaign management 319, and social media management 320. The software application package that is furthest along the applicable axis from the center 320 of the graph is the highest rated for that criteria. The user 103 chooses the software application programs (each one is a polygon) to be plotted and the business need dimensions (spokes other than right fit) that need to be considered. The platform 10 calculates how each software application program performs relative to each dimension and also the overall right fit score based on the relative user-specified priorities of the business needs.

Figure 3D:
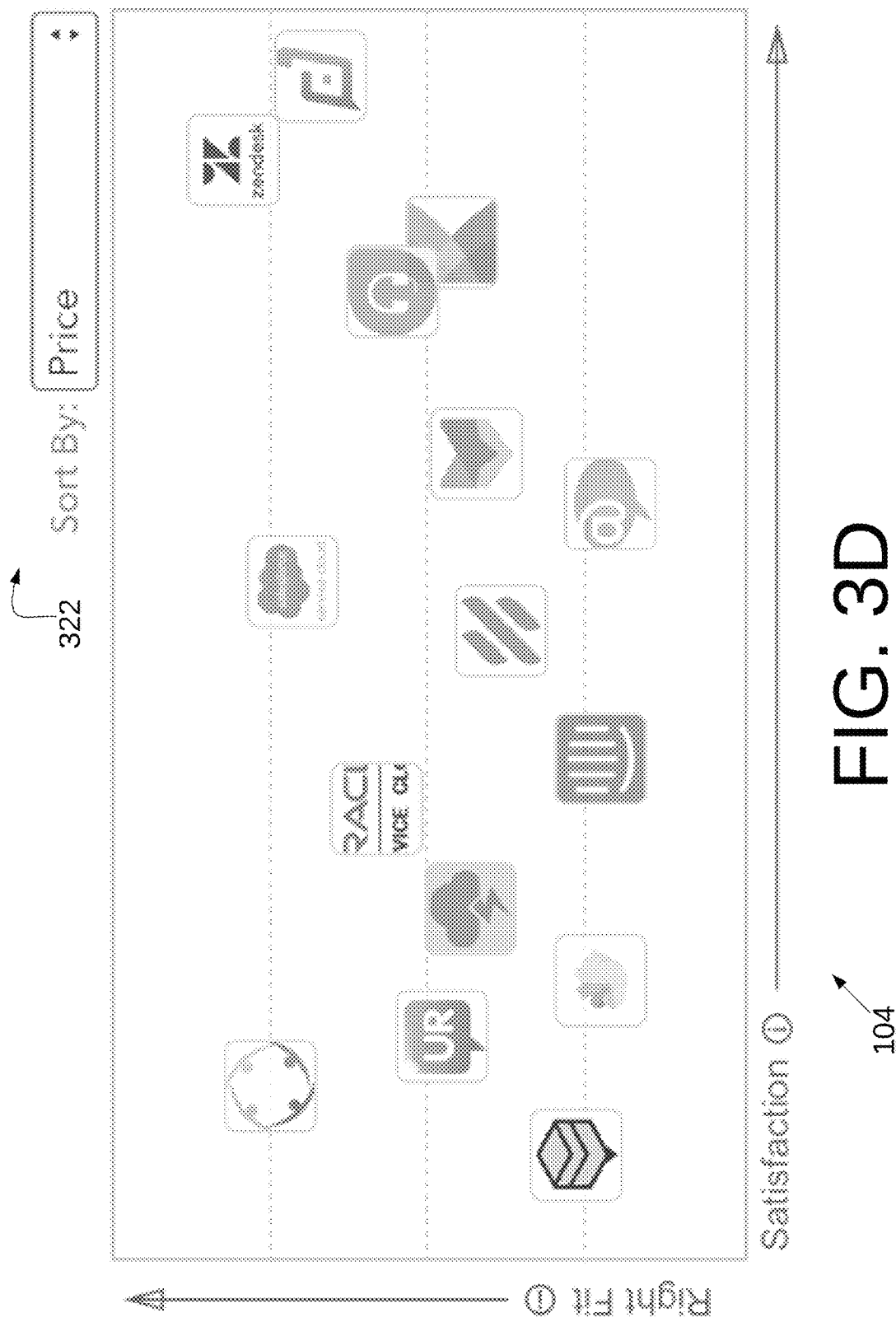

An expanded version of the graph 307 of FIG. 3A is shown in FIG. 3D where software application programs identified by the platform 10 in response to the user 103's query is provided plotted against right fit on vertical dimension and satisfaction of users with the software application program on the horizontal axis. The user 103 is permitted to sort the results by other criteria as shown at 322.

Figure 3E:
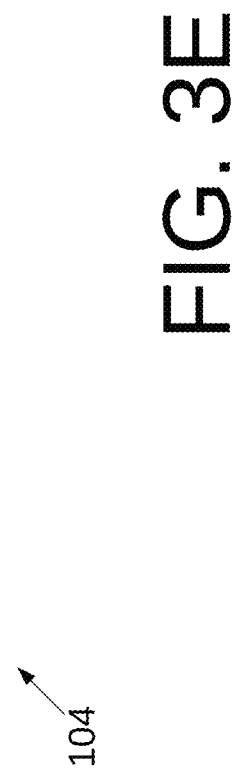

FIGS. 3E and 3F show example outputs of engagement portal as provided to a vendor of software application programs. In FIG. 3E, the platform 10 has computed which queries by purchasers are relevant to the purchaser user and which are trending over the prior 24 hours. A plurality of aspects of the queries are provided such as business need, industry, location, size, and other requirements. The top three vendors are also provided. Also, as seen at 330 and 331 the platform 10 anonymizes certain of the query criteria such as size and other requirements to protect the identity of the query submitter. In FIG. 3E the vendor user of the engagement portal 104 has not yet subscribed to the service and a prompt 332 is provided to permit the vendor user to subscribe. FIG. 3F shows output provided by the engagement portal 104 to a vendor user who has subscribed to and logged into the platform 10. The output shown are inquiries from purchaser users that are relevant to the vendor user's offered software application program(s). The vendor user has selected a geography (United States) 334, an industry (Computer Software) 335, and an inquiry state (Research) 336. The platform 10 is shown providing details of two inquiries submitted by purchaser users, which detail includes am inquiry identifier 337, a business need 338, an inquiry state 339, a consideration list state 340 and an action 341 for the vendor user.

Figure 4:
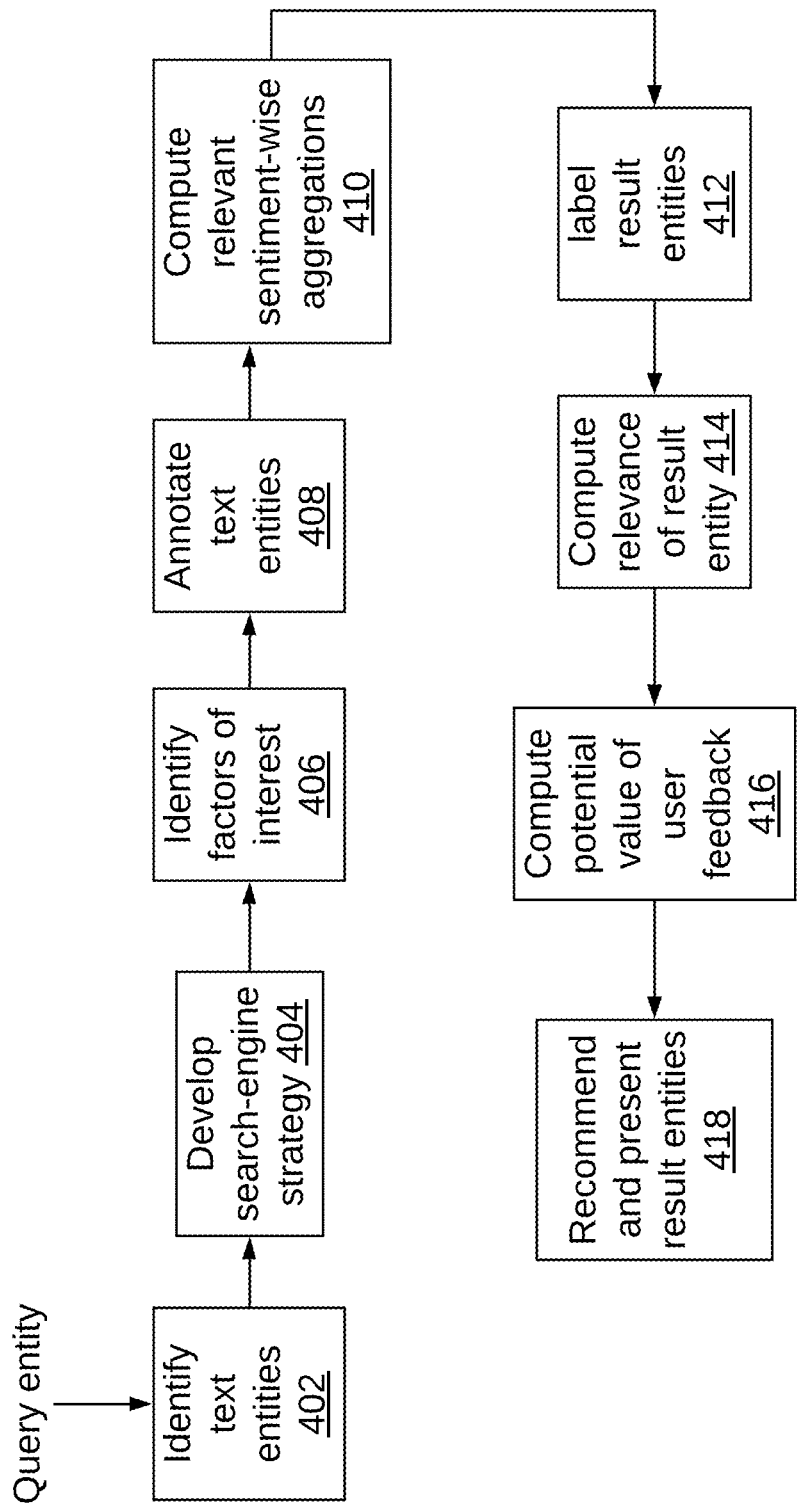
FIG. 4 is a flow diagram illustrating an embodiment of unsupervised matching performed by platform 10.

FIG. 4 is a flow diagram illustrating an embodiment of unsupervised matching performed by platform 10 using online text resources. The platform 10 recommends matching result entities (e.g., software products, services, datasets, experts, videos, articles) given a query entity (e.g., business user problem scenario), which is the problem statement shown in FIG. 3A, using online text resources. The platform 10 performs this as shown in FIG. 4 by identifying text entities 402 (e.g., software reviews, vendor reference customer use-cases) that can be assumed to be proxies for the query entity. A search-engine based strategy to gather all the relevant text entities for each result entity in the pool is developed at 404. In the case of business need of software recommendation, the pool of results is the set of all possible software application programs that can be recommended. In the case of expert recommendation, the pool of results is the set of all experts that are being considered for recommendation.

A conventional search engine such as Google® may be employed to perform web searches. At 406, factors of interest (e.g., business processes, business context) are identified that determine the match between a query and result entity. Each query entity (e.g., business problem scenario) is expressed as a vector where each dimension captures its association with a factor (e.g., retail industry, B2C, inbound marketing), i.e., query $$q=[q\_1, \ldots q\_i, \ldots q\_n] \text{ where } q\_i \text{ is the association score of query with factor } i.$$

Each result entity (e.g., software) is also expressed as a vector of the same size in terms of its fit/goodness for those exact set of factors, i.e., $$\text{result } r=[r\_1, \ldots, r\_i, \ldots r\_n] \text{ where } r\_i \text{ is the goodness or fit of the result for factor } i.$$

The overall goodness or match of the result for query can be obtained by aggregating across all the factors. There are multiple different ways to do this aggregation. A simple example involves sum of factor-wise products, i.e., match(q, r)=\sum_i q\_i*r\_i normalized appropriately.

The text entities with the various factors of interest are annotated at 408 along with associated sentiment using a combination of information extraction techniques (wrapper-induction, ML-based models). Sentiment takes values such as Positive, Negative, Neutral. Other factors include industries, company size, business processes. Models for sentiment extraction include the VADER, further details of which may be found in *Simplifying Sentiment Analysis using VADER in Python (on Social Media Text)*, P. Pandey (Sep. 23, 2018, which may be found at: https://medium.com/analytics-vidhya/simplifying-social-media-sentiment-analysis-using-vader-in-python-f9e6ec6fc52f. Models for concept annotation include spacy.io https://spacy.io/api/entityrecognizer. Relevant sentiment-wise aggregations are computed at 410 over the text entity annotations to estimate the likely relevance (as well as the support for estimation) of the result entity along each factor of interest. The result entities are labeled at 412 along different categories (e.g., in-recent-news, fast-growing, established-player, etc.). These categories are merely exemplary and are not exhaustive. An example of in-recent-news is a software application program that has been mentioned at least a minimum number of times in a recent time period (say 1 month) in news articles. An example of fast-growing is software application programs where the rate of increase of reviews, unique mentions is above a certain threshold. An example of established player is a software application program with consistent mentions (>some threshold) across a long time period.

At 414, the relevance (and support) of the result entity to a query entity as an aggregation over the result-factor relevance (and support) scores is computed, in a manner as described above in connection with operation 406. Next, at 416 the potential value of user feedback on a specific query-result pair is computed, and the result entities are recommended and presented at 418 based on their relevance, labels, and the potential value of user feedback. In certain embodiments, the platform 10 recommends relevant products, services, experts, articles, and videos (different types of results) given a business user problem scenario (query). The match scores are estimated based on evidence from text entities such as software reviews and reference customer use cases. In some other embodiments, the platform 10 recommends potential customer users, deployment experts, blog articles (different types of results) to a software vendor company (query). The match scores are based on evidence from aggregator software/vendor pages, product feature-plan pages and aggregated software reviews. In yet another class of embodiments, the platform suggests competing software/companies, complementary software/companies (different type of results) to a software vendor company (query). The match scores in this case are also based on aggregator software/vendor pages, product feature-plan pages, aggregated software reviews, but computed to account for adversarial/complementary relationships.

Figure 5:
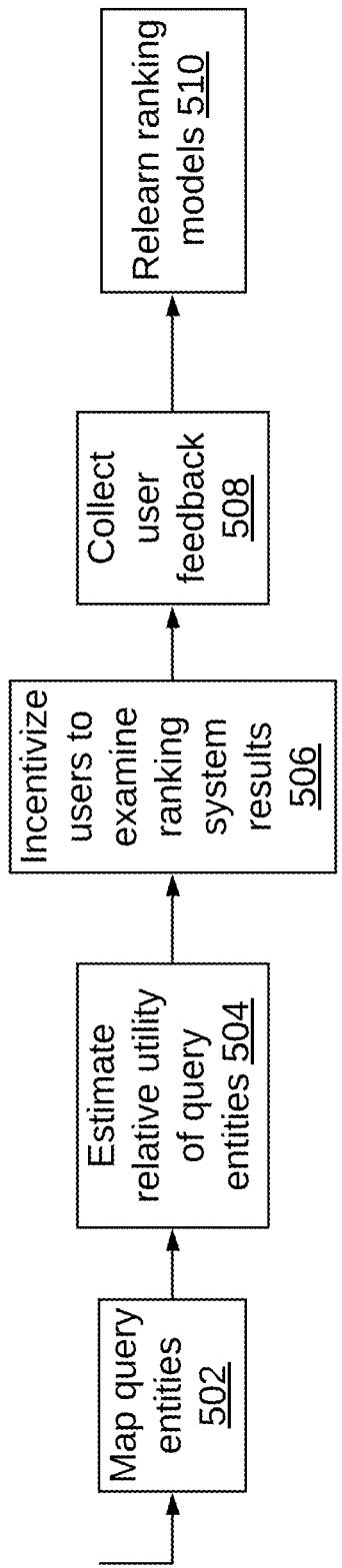
FIG. 5 is a flow diagram illustrating an embodiment of active learning performed by platform 10.

FIG. 5 is a flow diagram illustrating an embodiment of active learning performed by platform 10 which implements a rapid relevance learning system in the form of a self-improving ranking system that enables rapid active learning of (query-result) relevance models. The platform at 502 maps query entities in consideration to search engine queries and ad keywords. It then at 504 estimates relative utility of query entities based on search volume and Adword pricing (e.g. Adword®) from external sources by crawling, extracting or APIs). Relatively knowledgeable users are incentivized (506) to examine the ranking system results based on the importance of the query through gamification, such as for example, matching two random users on the same page with rewards when their relative ordering matches with each other to a certain extent). For example, a group of two or more random users (unknown to each other) are asked to rank softwares A, B based on its match for a business need. The majority judgement is computed and all the users whose judgement agrees with the majority are rewarded with additional reputation points. The users are thus incentivized to make a thoughtful guess than given a random response. For example, a group of two or more random users (unknown to each other) are asked to rank softwares A, B based on its match for a business need. The majority judgement is computed and all the users whose judgement agrees with the majority are rewarded with additional reputation points. The users are thus incentivized to make a thoughtful guess than given a random response.

Feedback from the knowledgeable users is collected at 508. This can take many forms, such as binary relevance, relative ranking, and can include explicit and implicit feedback. Moreover, feedback is also collected on the relative importance of features used by exposing the knowledgeable users in the presentation of the results (e.g., industry-fit is more important than company-size-fit). The platform 10 then at 510 re-learns, in one embodiment via supervised learning, the ranking models using a combination of both example and feature based feedback (e.g., generalized expectation based learning, such as described by G. Mann and A. McCallum in Generalized Expectation Criteria for Semi-Supervised Learning with Weakly Labeled Data, Journal of Machine Learning Research 11 (2010) 955-984, which may be found at the following URL: http://www.jmlr.org/papers/volume11/mann10a/mann10a.pdf).

In certain embodiments of the platform 10, the operations in FIG. 5 may be employed to identify important business processes based on search volume. Also in gamification of feedback collection via sending surveys related to an important topic (e.g., "How well do you know lead management?" or "How do experts like you rank lead management software applications?") to likely experts and asking questions related to those topics, recording answers and returning a response (e.g., summary of all expert opinions and whether the user agrees with the rest). Additionally, feedback from experts may be collected on the relative importance of matching on business needs, company context (industry, company-size, department), non-functional requirements (integrations, compliance, customer service, ease of use), vendor qualification (maturity, revenue), overall customer satisfaction for a product, volume of evidence associated with a product. The feedback collected by the foregoing operations can be used by the platform 10 to improve matching of business requirements to software application program. A similar methodology can be applied to improve matching of vendor companies to potential customers.

Figure 6:
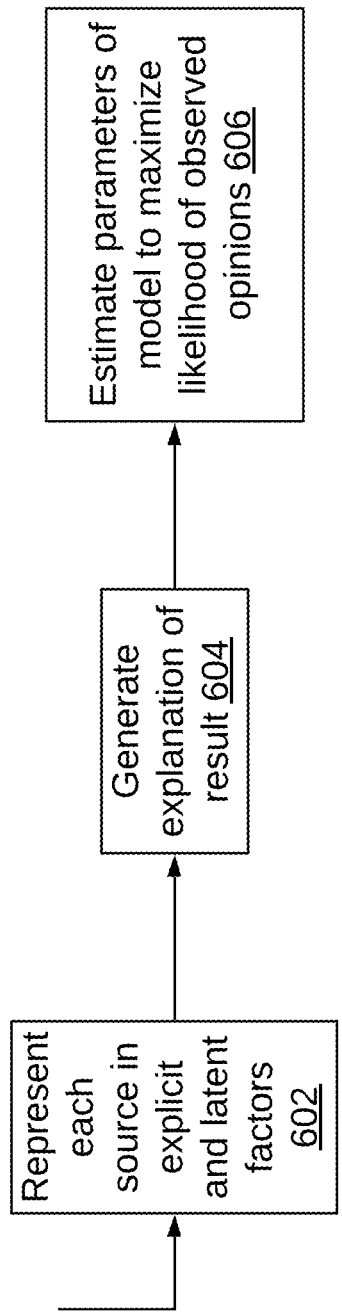
FIG. 6 is a flow diagram illustrating an embodiment of latent opinion-generation performed by platform 10.

FIG. 6 is a flow diagram illustrating an embodiment of latent opinion-generation performed by platform 10 to comprise a system for estimating the latent opinion-generation profile of sources (e.g., online web aggregators, users). At 602, each source is represented in terms of various explicit and latent factors (e.g., self-interest, knowledge level, role, industry) that form its opinion-generation profile. An explanation of the result is generated at 604 by assuming a parametric Bayesian model to explain how the source opinion-generation profile (e.g., g2crowd-paid-reviewer, industry=retail) objective properties of an entity (e.g., product-is moderately ok for retail) and the setting parameters (e.g., review on g2-crowd) result in the opinion. A g2crowd-paid reviewer from retail industry is an example of a source who has a bias towards giving positive reviews with expertise on issues from a specific industry. The platform 10 then at 606 simultaneously estimates the parameters of the Bayesian model as well as the latent part of the source opinion-generation profile, and entity properties so as to maximize the likelihood of the observed opinions. In certain embodiments, this latent opinion-generation can be employed to identify experts and peers by estimating for each review, the reviewer's (hidden) relative importance of different factors (business need, integrations, other requirements, pricing), company context (likely industry, company-size), expertise, as well as bias (e.g., paid reviewer always positive on all reviews, reference customer who might be getting discounts from a vendor, competitor). In this case, parametric models are employed to generate overall numeric review ratings as well as textual opinions.

Figure 7:
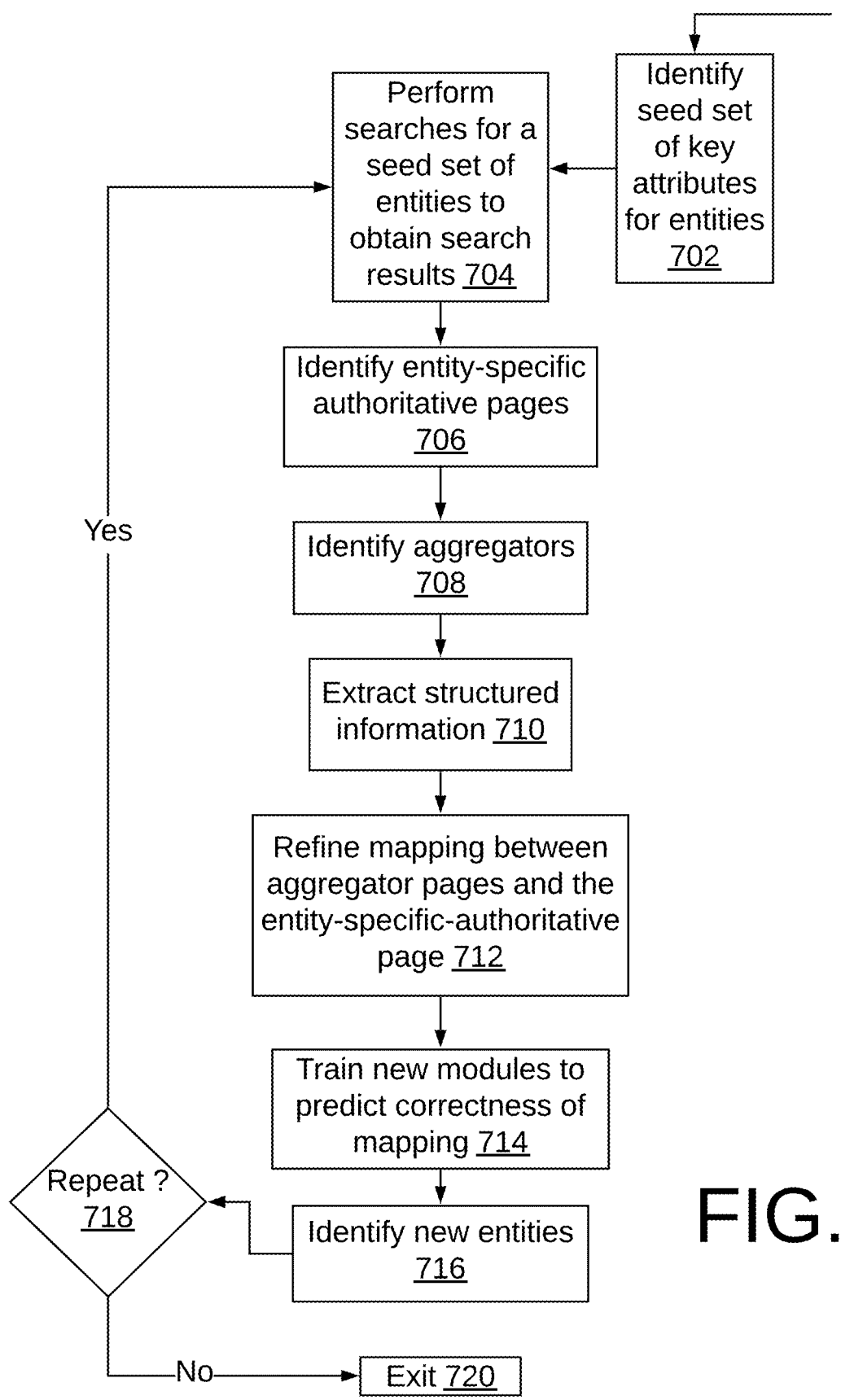
FIG. 7 is a flow diagram illustrating an embodiment of large-scale continuous entity-specific data collection performed by platform 10.

FIG. 7 is a flow diagram illustrating an embodiment of large-scale continuous entity-specific data collection performed by platform 10, to implement a system for near-automated collection and creation of data related to any specific entity from a particular entity class, such as software/company/consultant from (i) online aggregators pertinent to that entity class (e.g., g2crowd for software application programs, LinkedIn® for users, CrunchBase for companies), (ii) blog/news pages (iii) entity-specific authoritative pages (e.g., company's or person's own website) (iv) social media content (e.g., Twitter, Facebook posts). The platform 10 identifies at 702 a seed set of key attributes for entities (e.g., company founding year, software application program name(s) and at 704 uses word-embeddings to formulate search engine queries associated with each attribute. Searches are performed at 706 for a seed set of entities to obtain search results. Next at 708, entity-specific authoritative pages are identified based on in-links from the different web domains of the results corresponding to each entity. At 710, aggregators are identified with structured information based on the website URL domain/prefix frequency across results from multiple entities. At 712, template/wrapper-based extraction methods are employed to extract structured information (with one-time human in the loop to ensure accurate schema mapping+expansion as necessary). An example of software for wrapper-based extraction is the Scrapely package available from GitHub at: https://github.com/scrapy/scrapely. Scrapely is a library for extracting structured data from HTML pages. Given some example web pages and the data to be extracted, Scrapely constructs a parser for all similar pages. Additional details regarding wrapper induction may be found in *Wrapper Induction for Information Extraction*, N. Kushmerick, Dissertation for Doctor of Philosophy, Univ. of Washington (1997).

At 714, the mapping is refined between aggregator pages and the entity based on match of certain key attributes obtained from the aggregator and the entity-specific authoritative page. For example, CrunchBase URL for a company entity is likely correct if the website listed on CrunchBase matches the actual website of that company. At 716, the output of 714 is employed as supervised data to train new models that can predict the correctness of the mapping between query and aggregator page using features directly constructed from search engine output (without requiring extraction). New entities are identified at 718 by crawling and extracting the discovered extractors and a test is performed at 720 to determine if the foregoing steps need to be repeated. In certain embodiments, this large-scale continuous entity-specific data collection may operate on official pages, reviews, blogs, reviews, news, social media posts, independent software vendor posted content (such as user stories testimonials, videos) on software application programs, companies, news, and blogs by experts.

Figure 8:
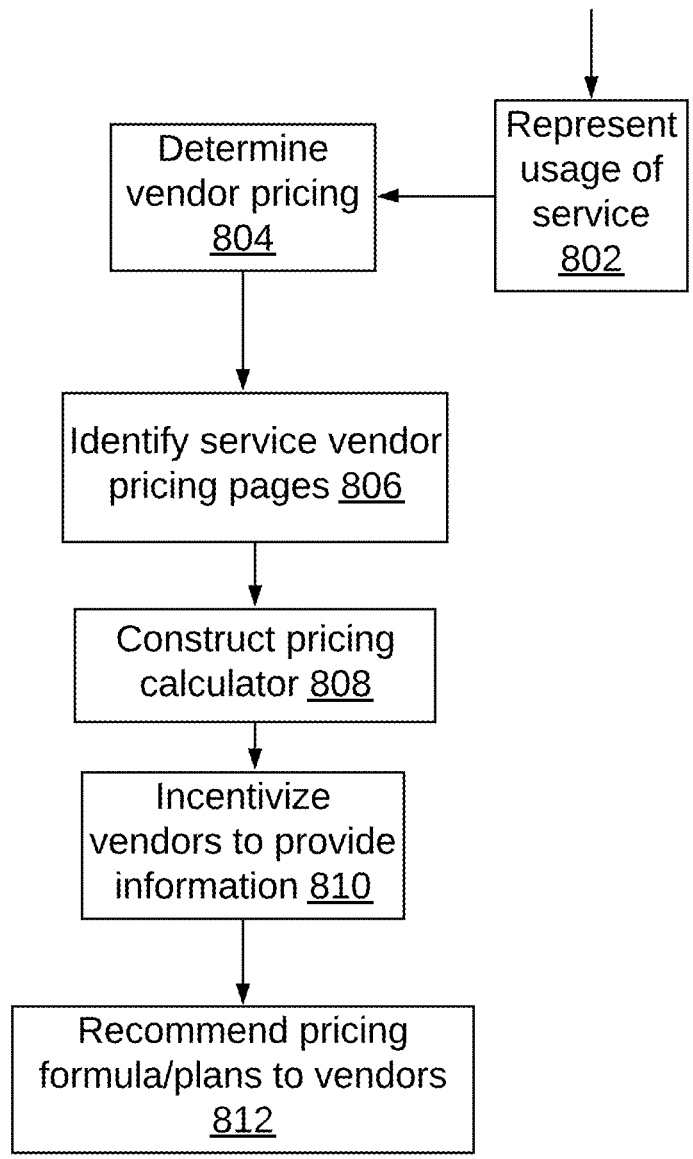
FIG. 8 is a flow diagram illustrating an embodiment of price comparison and pricing plan optimization performed by platform 10.

FIG. 8 is a flow diagram illustrating an embodiment of price comparison and pricing plan optimization performed by platform 10 from both the buyer and seller perspectives. This implements a system for price comparison (for service consumers) and pricing plan optimization (for service providers) that involves, representing at 802, usage of a service based on the tenure (start-end of the contract), quantity along various possibly non-exclusive dimensions (e.g., #users, #emails sent, #licenses, #hours), and service offering (i.e., which subset of allowed features are used). At 804 a vendor's price offering is represented as a parametrized function with piecewise step and ramp functions that determines the vendor's pricing (e.g, $100) for a particular usage (e.g., 6 months, 5 users, features, A, B). At 806, service vendor pricing pages are identified using appropriate search engine queries and extracting vendor pricing information from publicly available vendor pricing pages using machine learning/wrapper-based information extraction methods, such as described above in connection with the Scrapely package. At 808, a pricing calculator is constructed to allow service buyers to compare the likely pricing across similar services. At 810, vendors are incentivized to share more accurate pricing information by providing aggregates of buyer likely-usage information in order to update the calculators. At 812, the buyer likely-usage information for that very service and related services is used to recommend pricing formula/plans to vendors tailored to optimize desired objectives (e.g., k most used packages that maximize profit). This involves non-linear stochastic optimization but is tractable when overall pricing formula is parametrized using step/ramp functions. This may be better understood by way of the following example. Service usage is encoded as a vector of many factors, e.g., tenure, geo, #users, and #uses of each feature. A particular pricing plan is a function defined on service usage. Typically to support human interpretability the pricing plans are linear combinations of piecewise linear functions defined on subsets of service usage elements. A piecewise linear function has the form $$f(x)=a\_1 \cdot x+b\_1 \text{ for } c\_1<=x,$$

$$a\_2 \cdot x+b\_2 \text{ for } c\_1<x<=c\_2$$

$$a\_3 \cdot x+b\_3 \text{ for } c\_2<x<=c\_3 \text{ and so on.}$$

Here a_i's, b_i's and c_i's are the parameters in the pricing plan that can be potentially be chosen so as to maximize the vendor revenue given the distribution of service usage, i.e., x. Step and ramp functions are special cases of piecewise linear functions. A simple example of a pricing formula is $$\text{Price for email\_marketing product}=f\_1(\theta\_1, \text{number\_of users})+f\_2(\theta\_2, \text{number\_of emails})+f\_3(\theta\_3, \text{customer\_service\_options})$$

where f_1, f_2, f_3 could all be piecewise linear functions. In certain embodiments, the foregoing price comparison and pricing plan optimization take the form of a pricing calculator for business users, pricing optimizer for software vendors, and usage distribution reports for others.

Figure 9:
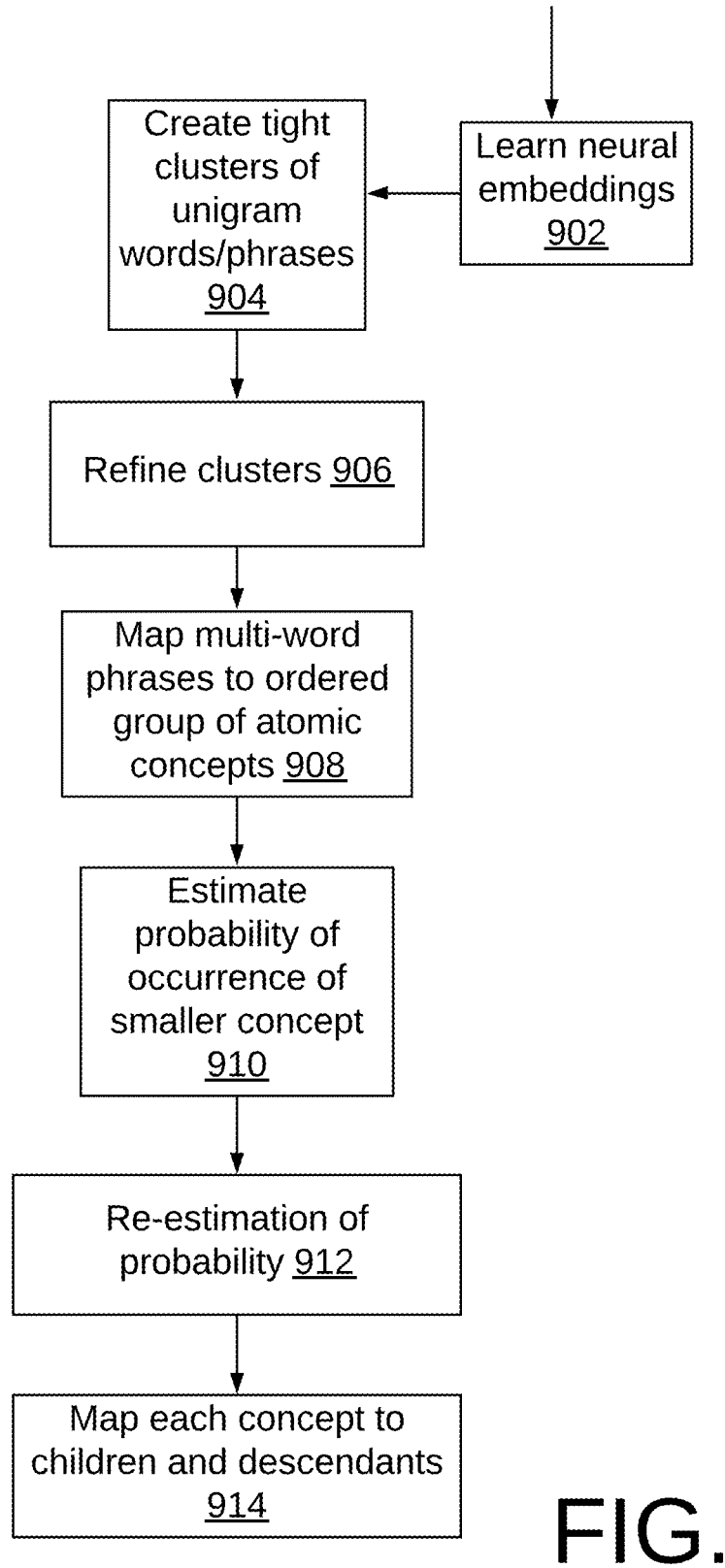
FIG. 9 is a flow diagram illustrating an embodiment of ontology generation performed by platform 10.

FIG. 9 is a flow diagram illustrating an embodiment of ontology creation performed by platform 10 to implement a semi-automated mechanism for creation of high-quality domain-specific ontologies with each concept mapped to relevant words/phrases aggregated appropriately in a hierarchical fashion. This is performed by at 902, learning neural embeddings for unigrams and common-phrases on a text corpus corresponding to a domain. At 904, neural embeddings are used to create tight clusters of unigram words/phrases that are near synonyms. At 906, the clusters are refined with human domain experts to create an initial set of atomic concepts. At 908, mapping each common (based on relative frequency) multi-word phrase is mapped to an ordered group of atomic concepts to create complex concepts. At 910, an estimate is generated of the probability that the occurrence of the smaller concept in some context (e.g., sentence, paragraph) implies the occurrence of the complex concept from the corpus. At 912, data is taken in from domain experts who re-estimate this probability and also create new concepts in terms of other smaller ones, as well as add other forms of relationships. This is similar in ways to WordNet® (https://wordnet.princeton.edu), a large lexical database of English, that groups nouns, verbs, adjectives and adverbs into sets of cognitive synonyms (synsets), with each expressing a distinct concept. At 914, each concept is mapped to its children and descendants all the way to atomic concepts. In certain embodiments, the foregoing ontology creation may be employed in organizing marketing business needs as goals, activities, channels as well as non-functional requirements into appropriate hierarchies and directed graphs.

Figure 10:
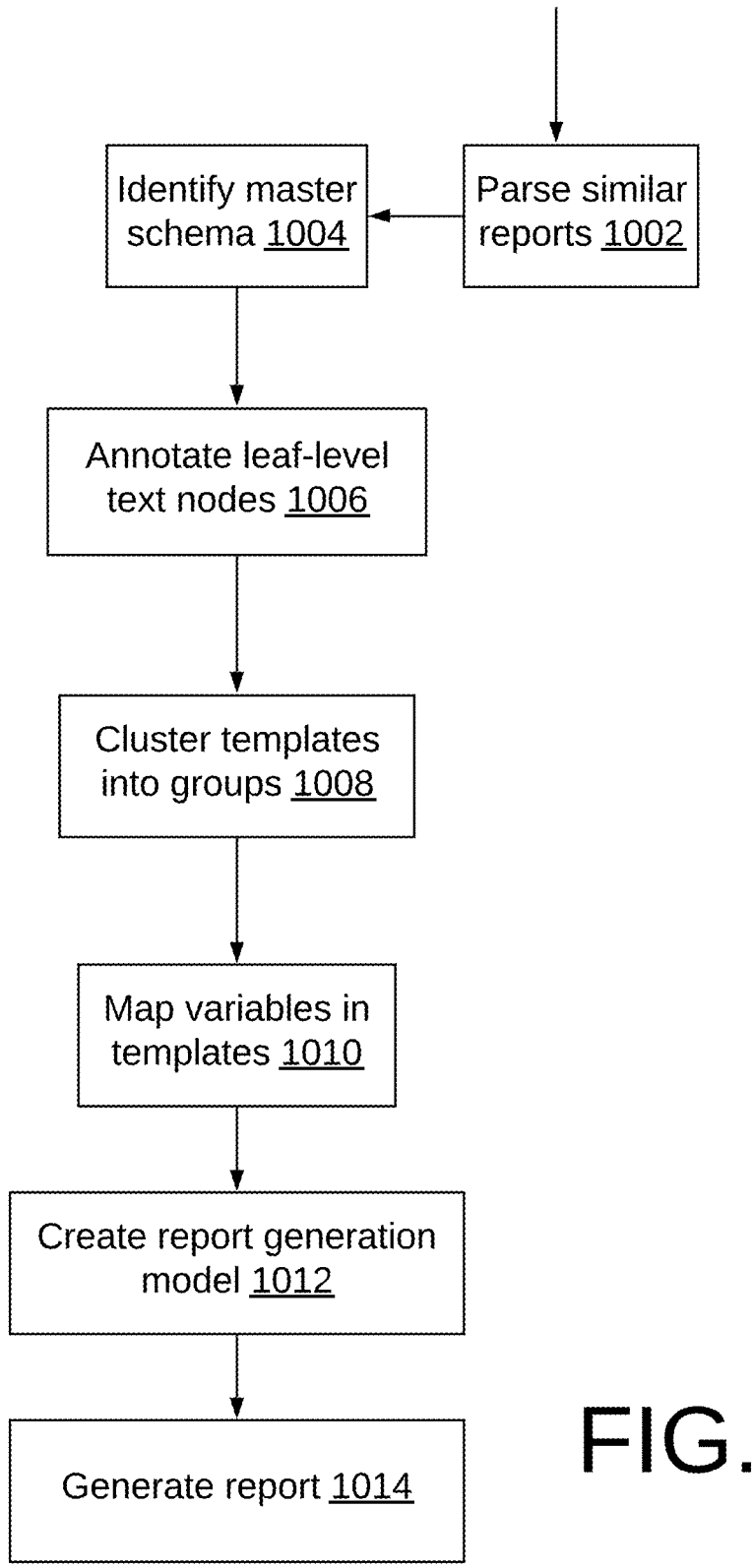
FIG. 10 is a flow diagram illustrating an embodiment of report generation performed by platform 10.

FIG. 10 is a flow diagram illustrating an embodiment of report generation performed by platform 10 to provide a system for designing and automatically populating a report (e.g., personalized software recommendation report) that is specific to some entity, (e.g., business user requirement). This involves, at 1002, parsing a collection of similar human generated reports to identify the hierarchical structure in each report represented as a tree. Identifying at 1004 a master schema for reports by merger of the structure trees generated from individual reports and refining them using human expertise. Then at 1006, annotating the leaf-level text nodes (sentences/paragraphs) with concepts of different classes (e.g., software name) to generate templates. The templates are clustered at 1008 into groups that correspond to elements of interest, which can be further refined by human experts and/or used to learn a natural language generation model. At 1010, the variables are mapped in the templates to specific properties of the relevant entity. At 1012, a report generation model is generated by combining the master report schema, NLG models corresponding to each element and the variable bindings, text summarization models. Master report schema refers to a schema i.e., a hierarchy of sections, subsections all the way to atomic elements. For example, in a software recommendation report, the sections might include 'Software Profiles', 'Right Fit Landscape', 'Strengths and Weaknesses' etc. while the atomic elements might pertain to suitability of software for a particular industry or business process or channel. Each atomic element is a n-ary relationship between multiple entities and is association with NLG (natural language generation) models. A common example of NLG models are template based models where the text is generated using one or more templates such as "<Software> is best known for <Process> with positive mentions from <Positive_User_Fraction> of users." by binding the variables in templates to the appropriate values. NLG models can be combined with text selection methods to also construct more natural looking and informative text summaries, such as performed by the TextRank package available GitHub at https://github.com/DerwenAl/pytextrank, which is a python implementation of TextRank, based on a paper entitled TextRank: Bringing Order into Texts, R. Mihalcea et al., Dept. of Computer Science, Univ. of North Texas (2004).

At 1014, a report is generated given a concrete entity using the report generation model and data associated with that entity. In certain embodiments, the foregoing this provides requirements report to assist business users refine their requirements based on a large pool of peers. It also provides a personalized software recommendation report to help business users choose the best software application program based on their specific business needs, company context, other non-functional requirements and pricing constraints. This report generation capability also provides a 360-degree product view and competitive intelligence reports for vendors to see how their product is perceived externally and how it fares relative to other products.

Figure 11:
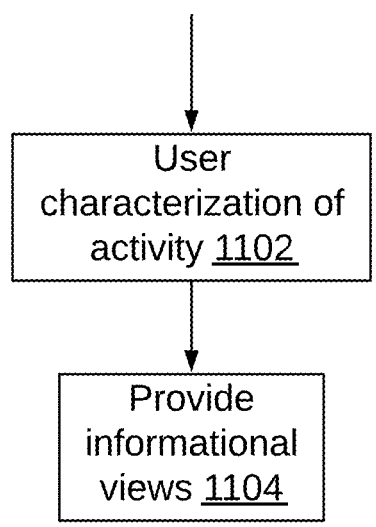
FIG. 11 is a flow diagram illustrating an embodiment for performing collaborative business research as performed by platform 10.

FIG. 11 is a flow diagram illustrating an embodiment for performing collaborative business research as implemented by platform 10. This provides a system for collaborative research on business problems that allows users to effectively combine organizational knowledge, the expertise of their peers across organizations as well as publicly available information. This is performed by at 1102, receiving data from users that have characterized their activity on the platform as associated with a particular organization, intent, persona, business context and also limited the visibility of their activity, and explicit feedback to a specific group. At 1104, informational views (ranking, comparison, reports) are provided that aggregate and contrast information from different sources (users within an organization, peers, consultants, all public sources) based on user specified weights or weights learned by the system using historical user behavior. In certain embodiments, the foregoing collaborative business research permits a team of business users collaborating on identifying requirements, to create an RFP, choose the right vendor, and obtain approvals.

Figure 12:
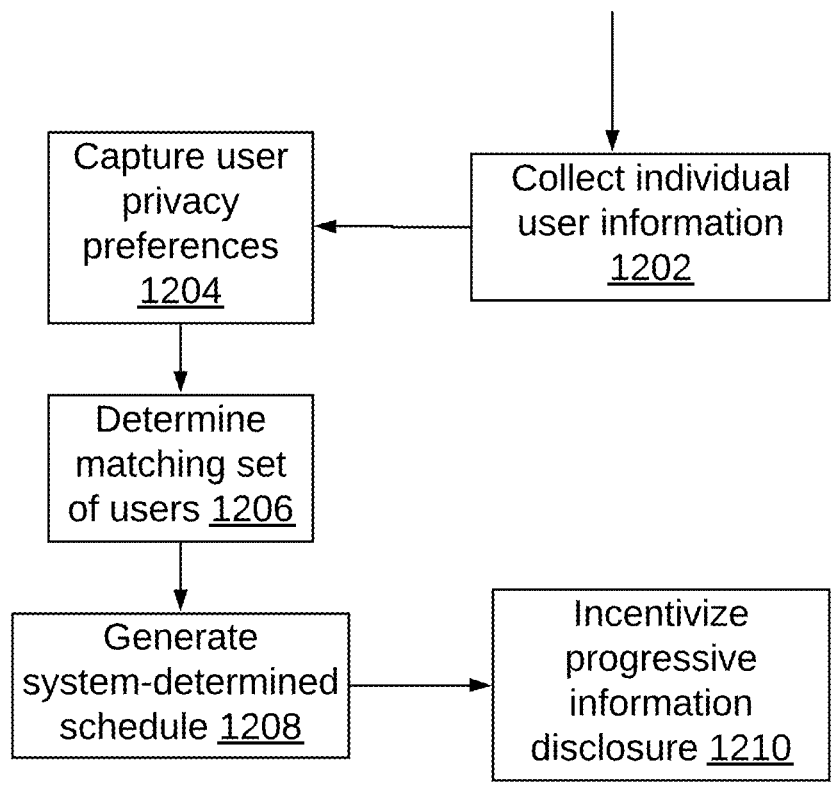
FIG. 12 is a flow diagram illustrating an embodiment of an engagement portal as performed by platform 10.

FIG. 12 is a flow diagram illustrating operation of engagement portal 104 of platform 10. The engagement portal 104 brings together users of varying interests (e.g., software buyers, sellers, consultants) to facilitate transactions in an efficient near-synchronous manner. At 1202, the engagement portal 104 operates to collect individual user information (requirements/offerings) in a structured way (e.g., buyer's request for quote, clarification on features). At 1204, the user's privacy preferences are captured on (i) how the provided data can be used for matching and (ii) what part of data can be shared with whom. At 1206, the matching set of users (e.g., sellers, peers with similar requirements) for a given user (e.g., potential buyer) are automatically determined based on existing historical data and the relevant information is passed to the user. At 1208 a system-determined schedule (with expiry dates) is set up for interaction to facilitate faster interactions and predictable behavior. At 1210, information auctions are provided to the user to incentivize progressive information disclosure to permit the platform 10 to optimize the matching. An information auction involves offering additional value to a group of users (e.g., connecting a software vendor to a potential software buyer) based on who (i.e., which vendor) shares the most amount of information (e.g., details on pricing, previous customer references). This is in contrast to typical auctions where different players bid on an item and the one who offers to pay the most gets it.

Figure 13:
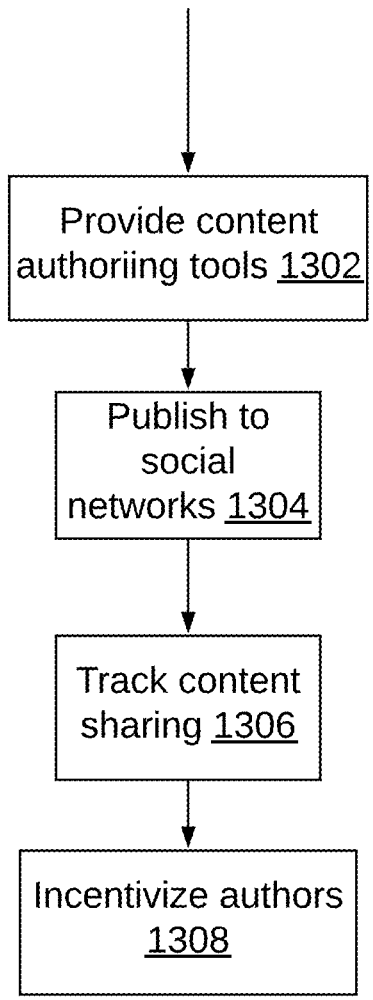
FIG. 13 is a flow diagram illustrating an embodiment of crowd-sourced marketing as performed by platform 10.

FIG. 13 is a flow diagram illustrating an embodiment of crowd-sourced marketing as performed by platform 10. This advantageously incentivizes experts to contribute relevant content to the platform 10 and also actively distribute it on their personal communication networks by, at 1302, providing content authoring tools with suggestions on structure and relevant topics. The platform also, at 1304, provides tools that automatically publish to various social networks, such a LinkedIn®, and Twitter®. influence monitoring tools that track how the content is shared across networks are provided (1306) along with incentives that credit authors for the reach of their content (1308). This crowd-sourced marketing capability incentivizes expert users and vendors to contribute their software, business process specific blogs and news to the platform 10 by providing authoring/publishing tools and more importantly monitors that estimate the reach on various social networks such as Facebook®, Twitter®, LinkedIn®, etc.

The embodiments herein can be implemented in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at time of sale or delivery. Thus, delivering a device with stored content, or offering content for download over a communication medium may be understood as providing an article of manufacture with such content described herein.

The terms "computer system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

Figure 14:
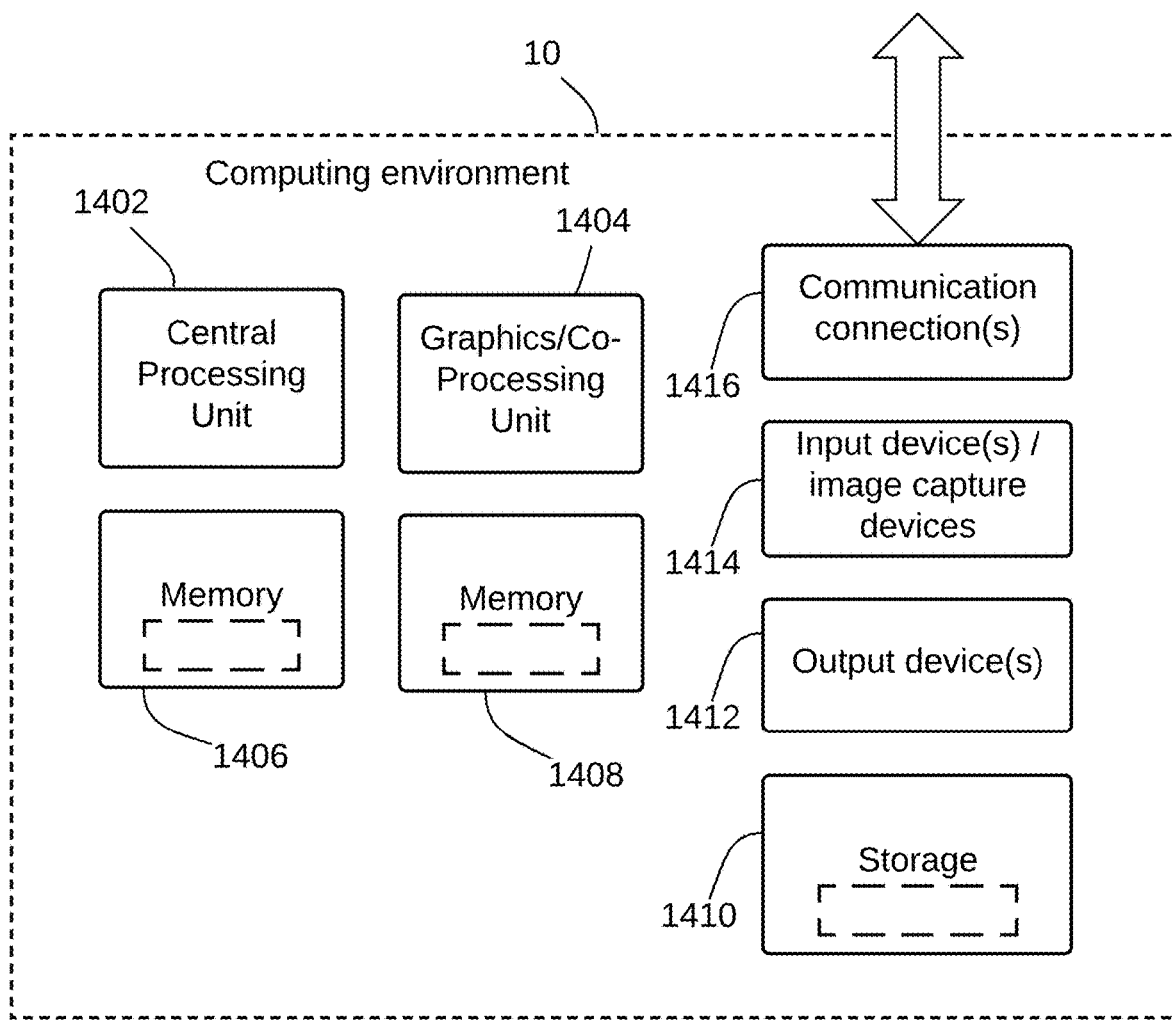
FIG. 14 is a block diagram of computer hardware that may be employed in certain embodiments of computer systems described herein.

FIG. 14 illustrates a block diagram of hardware that may be employed in an implementation of the platform 10 as disclosed herein, in which the described innovations may be implemented in order to improve the processing speed and efficiency with which the hardware operates to perform the functions disclosed herein. With reference to FIG. 14 the computing system 10 includes one or more processing units 1402, 1404 and memory 1406, 1408. The processing units 1402, 1404 execute computer-executable instructions. A processing unit can be a general-purpose central processing unit (CPU), processor in an application-specific integrated circuit (ASIC) or any other type of processor. The tangible memory 1406, 1408 may be volatile memory (e.g., registers, cache, RAM), non-volatile memory (e.g., ROM, EEPROM, flash memory, etc.), or some combination of the two, accessible by the processing unit(s). The hardware components in FIG. 14 may be standard hardware components, or alternatively, some embodiments may employ specialized hardware components to further increase the operating efficiency and speed with which the computer system 10.1 operates. The various components of computer system 10 may be rearranged in various embodiments, and some embodiments may not require nor include all of the above components, while other embodiments may include additional components, such as specialized processors and additional memory.

Computing system 10 may have additional features such as for example, storage 1410, one or more input devices 1414, one or more output devices 1412, and one or more communication connections 1416. An interconnection mechanism (not shown) such as a bus, controller, or network interconnects the components of the computing system 10.

Typically, operating system software (not shown) provides an operating system for other software executing in the computing system 10, and coordinates activities of the components of the computing system 10.

The tangible storage 1410 may be removable or non-removable, and includes flash memory, magnetic disks, magnetic tapes or cassettes, CD-ROMs, DVDs, nonvolatile random-access memory, or any other medium that can be used to store information in a non-transitory way and that can be accessed within the computing system 10. The storage 1410 stores instructions for the software implementing one or more innovations described herein.

The input device(s) 1414 may be a touch input device such as a keyboard, mouse, pen, or trackball, a voice input device, a scanning device, or another device that provides input to the computing system 10. For video encoding, the input device(s) 1414 may be a camera, video card, TV tuner card, or similar device that accepts video input in analog or digital form, or a CD-ROM or CD-RW that reads video samples into the computing system 10. The output device(s) 1412 may be a monitor, printer, speaker, CD-writer, or another device that provides output from the computing system 10.

The communication connection(s) 1416 enable communication over a communication medium to another computing entity (such as between computer system 10.1 and computer system 10.2). The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

It should be understood that functions/operations shown in this disclosure are provided for purposes of explanation of operations of certain embodiments. The implementation of the functions/operations performed by any particular module may be distributed across one or more systems and computer programs and are not necessarily contained within a particular computer program and/or computer system.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system comprising a computer configured to execute computer readable instructions for a computer platform to enable social interaction between business users, consultant/experts and independent software vendors to network, research, learn and match software application programs to business needs, the computer platform comprising:
    a hierarchy, comprising hierarchically arranged textual keywords or terminology commonly used to identify business processes, tuned for a plurality of industry verticals across a plurality of business functions;
    an information extraction engine to:
        identify, on identified webpages, textual keywords or terminology commonly used to identify business processes in the hierarchy;
        identify, in the identified webpages, textual keywords or terminology commonly used to identify business contexts;

identify user sentiment of software application programs referenced implicitly or explicitly in the identified webpages by way of textual keywords or terminology;
a machine learnt model that employs the hierarchy to:
predict a score that quantifies user perception of suitability of one or more software application programs as a function of business need and business context;
predict keywords that represent related business needs for a business user given expressed needs of the business user; and
a user interface to provide recommendations of completeness of business needs based on the machine learnt model by:
collecting keywords or terminology that define the business context of the business user and finding software application programs most relevant to the business user;
employing the machine learnt model to predict satisfaction of the business user with each of the software application programs as a function of business needs and business context of the business user; and
asking the business user to select other keywords that define the relevant processes that the software application program needs to address to complete the business user's business need;
wherein the machine learnt model is trained with training data characterized by a set of reviews where each data for each review of the set of reviews is organized in accordance with a context vector for a company, a software application identifier that identifies a software application program provided by the company and an outcome vector of size N, where N represents a number of processes implemented by the software application program, that captures outcomes of using the software application program identified by the software application identifier in the context defined by the context vector for the N processes.

2. The system of claim 1, wherein the user interface comprises: a software application purchaser interface specifically customized to prospective purchasers of software application programs; and a software application vendor interface specifically customized to prospective vendors of software application programs.

3. The system of claim 2, wherein the software application purchaser interface provides to the business user a visual display of software application programs organized along dimensions of preference expressed by the business user.

4. The system of claim 1, wherein the information extraction engine predicts user perception of suitability of one or more software application programs as a function of business need and business context by employing hierarchical smoothing of an estimated satisfaction score for each software application program for a given process and business context.

5. The system of claim 1, wherein the information extraction engine employs word movers distance (WMD) to identify processes in the hierarchy that are contained on identified webpages.

6. The system of claim 1, wherein collecting the business context of the business user and finding software application programs most relevant to the business user employing the machine learnt model to predict satisfaction of the business user with each of the software application programs as a function of business needs and business context of the business user comprises: generating a ratio of how many times a software application program is mentioned along with business needs expressed by the business user to a total number of mentions of other business needs, as expressed by other users, for the software application program.

7. The system of claim 1, wherein the machine learnt model operates to smooth spotted business needs from webpages using the hierarchy.

8. The system of claim 1 further comprising,
periodically crawling the world-wide-web to generate the identified webpages as a function of a curated listing of webpages.

9. The system of claim 8 further comprising, processing results of crawling of the world-wide-web by extracting predefined types of structured data from the results.

10. The system of claim 1, wherein the hierarchy, comprising hierarchically arranged textual keywords or terminology commonly used to identify business processes, tuned for a plurality of industry verticals across a plurality of business functions forms an ontology comprising a plurality of concepts defined by the hierarchically arranged textual keywords or terminology, with each concept being mapped to relevant words/phrases in a taxonomy aggregated in a hierarchical fashion.

11. The system of claim 1, wherein the user interface further operates to: accept inputs by the business user to generate a request for proposal; respond to additional inputs from the business user by providing the request for proposal to other users comprising vendors, without exposing identity of the business user to the vendors; and request feedback from the vendors to be entered, by way of the user interface, on the request for proposal.

12. The system of claim 11, wherein the user interface further operates to: automatically generate on behalf of a vendor a response to the request for proposal as a function of pricing of one or more software application programs that match requirements in the request for proposal, and further as a function of publicly available information identified by searching as a function of information contained in the request for proposal.

13. The system of claim 1, wherein the user interface further operates to: anonymize queries submitted by the business user regarding software application programs offered by vendors; and post the queries for review and response by vendors by way of the user interface.

14. The system of claim 1, wherein the computer platform assigns a higher confidence to textual keywords or terminology higher in the hierarchy than to textual keywords or terminology that are lower in the hierarchy.

15. The system of claim 14, wherein the operation of employing the machine learnt model to predict satisfaction of the business user with each of the software application programs as a function of business needs and business context of the business user is performed by identifying co-occurrence of processes identified by the keywords or terminology that define the business context of the business user in a co-occurrence matrix which contains data of how many times one or more processes are identified in webpages processed by the information extraction engine.

16. A computer-implemented method to enable social interaction between business users, consultant/experts and independent software vendors to network, research, learn and match software application programs to business needs, the computer-implemented method comprising the operations of:
generating a hierarchy, comprising hierarchically arranged textual keywords or terminology commonly used to identify business processes, tuned for a plurality of industry verticals across a plurality of business functions;

operating an information extraction engine to:
identify, on identified webpages, textual keywords or terminology commonly used to identify business processes in the hierarchy;
identify, in the identified webpages, textual keywords or terminology commonly used to identify business contexts;
identify user sentiment of software application programs referenced implicitly or explicitly in the identified webpages by way of textual keywords or terminology;

generating a machine learnt model that employs the hierarchy to:
predict a score that quantifies user perception of suitability of one or more software application programs as a function of business need and business context;
predict keywords that represent related business needs for a business user given expressed needs of the business user; and generating a user interface to provide recommendations of completeness of business needs based on the machine learnt model by:
collecting keywords or terminology that define the business context of the business user and finding software application programs most relevant to the business user;
employing the machine learnt model to predict satisfaction of the business user with each of the software application programs as a function of business needs and business context of the business user; and
asking the business user to select other keywords that define the relevant processes that the software application program needs to address to complete the business user's business need;

wherein the machine learnt model is trained with training data characterized by a set of reviews where each data for each review of the set of reviews is organized in accordance with a context vector for a company, a software application identifier that identifies a software application program provided by the company and an outcome vector of size N, where N represents a number of processes implemented by the software application program, that captures outcomes of using the software application program identified by the software application identifier in the context defined by the context vector for the N processes.

17. A computer program product stored on a non-transitory computer readable storage medium and including instructions for causing a computer system to execute a method to enable social interaction between business users, consultant/experts and independent software vendors to network, research, learn and match software application programs to business needs, the method comprising the actions of:

generating a hierarchy, comprising hierarchically arranged textual keywords or terminology commonly used to identify business processes, tuned for a plurality of industry verticals across a plurality of business functions;

operating an information extraction engine to:
identify, on identified webpages, textual keywords or terminology commonly used to identify business processes in the hierarchy;
identify, in the identified webpages, textual keywords or terminology commonly used to identify business contexts;
identify user sentiment of software application programs referenced implicitly or explicitly in the identified webpages by way of textual keywords or terminology;

generating a machine learnt model that employs the hierarchy to:
predict a score that quantifies user perception of suitability of one or more software application programs as a function of business need and business context;
predict keywords that represent related business needs for a business user given expressed needs of the business user; and generating a user interface to provide recommendations of completeness of business needs based on the machine learnt model by:
collecting keywords or terminology that define the business context of the business user and finding software application programs most relevant to the business user;
employing the machine learnt model to predict satisfaction of the business user with each of the software application programs as a function of business needs and business context of the business user; and
asking the business user to select other keywords that define the relevant processes that the software application program needs to address to complete the business user's business need;

wherein the machine learnt model is trained with training data characterized by a set of reviews where each data for each review of the set of reviews is organized in accordance with a context vector for a company, a software application identifier that identifies a software application program provided by the company and an outcome vector of size N, where N represents a number of processes implemented by the software application program, that captures outcomes of using the software application program identified by the software application identifier in the context defined by the context vector for the N processes.

18. The computer program product of claim 17 wherein the user interface comprises:
a software application purchaser interface specifically customized to prospective purchasers of software application programs; and
a software application vendor interface specifically customized to prospective vendors of software application programs.

19. The computer program product of claim 17 wherein the information extraction engine predicts user perception of suitability of one or more software application programs as a function of business need and business context by employing hierarchical smoothing of an estimated satisfaction score for each software application program for a given process and business context.

20. The computer program product of claim 17 wherein the information extraction engine employs word movers distance (WMD) to identify processes in the process hierarchy that are contained on identified webpages.

* * * * *